United States Patent
Androsov et al.

(10) Patent No.: US 10,538,666 B2
(45) Date of Patent: Jan. 21, 2020

(54) COMPOUND, POLYMER, FILM, AND OPTICAL DEVICE

(71) Applicant: Samsung Electronics Co., Ltd., Suwon-si, Gyeonggi-do (KR)

(72) Inventors: Dmitry Androsov, Suwon-si (KR); Kalinina Fedosya, Hwaseong-si (KR); Hyunseok Choi, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/263,355

(22) Filed: Jan. 31, 2019

(65) Prior Publication Data

US 2019/0233643 A1 Aug. 1, 2019

(30) Foreign Application Priority Data

Jan. 31, 2018 (KR) .................. 10-2018-0012449

(51) Int. Cl.
*H01L 51/50* (2006.01)
*C07D 405/14* (2006.01)
*C08L 79/08* (2006.01)
*C08G 73/10* (2006.01)

(52) U.S. Cl.
CPC .......... *C08L 79/08* (2013.01); *C08G 73/1007* (2013.01); *C08L 2203/16* (2013.01); *C08L 2203/20* (2013.01)

(58) Field of Classification Search
CPC .............................. C07D 405/14; H01L 51/50
USPC .......................................... 548/454; 313/504
See application file for complete search history.

(56) References Cited

FOREIGN PATENT DOCUMENTS

JP 2014-126721 A 7/2014

OTHER PUBLICATIONS

Masatoshi Hasegawa et al. "Poly(ester imide)s Possessing Low Coefficient Thermal Expansion and Low Water Absorption", High Performance Polymers, 2006, 18, 697-717.
Masatoshi Hasegawa et al. "Optically transparent aromatic poly(ester imide)s with low coefficients of thermal expansion (1). Self-orientation behavior during solution casting process and substituent effect", Polymer 2015, 74, 1-15.
Masatoshi Hasegawa et al. "Solution-processable transparent polyimides with low coefficients of thermal expansion and self-orientation behavior induced by solution casting", European Polymer Journal 2013, 49, 3657-3672.

*Primary Examiner* — Charanjit Aulakh
(74) *Attorney, Agent, or Firm* — Cantor Colburn LLP

(57) ABSTRACT

A monomer represented by Chemical Formula 1:

Chemical Formula 1

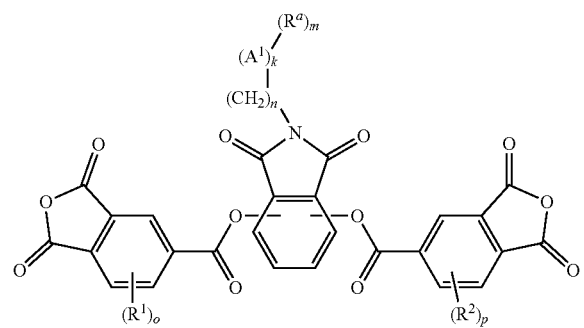

wherein, in Chemical Formula 1, $R^1$, $R^2$, o, p, $A^1$, $R^a$, m, k and n are the same as defined in the detailed description.

20 Claims, 5 Drawing Sheets

COMPOUND, POLYMER, FILM, AND OPTICAL DEVICE

CROSS-REFERENCE TO RELATED APPLICATION

This application claims priority to Korean Patent Application No. 10-2018-0012449 filed in the Korean Intellectual Property Office on Jan. 31, 2018, and all the benefits accruing therefrom under 35 U.S.C. § 119, the content of which is incorporated herein in its entirety by reference.

BACKGROUND

1. Field

A compound, a polymer, a film, an optical device are disclosed.

2. Description of the Related Art

Research efforts have been undertaken to produce a colorless transparent material that is suitable for diverse purposes, such as for an optical lens, a functional optical film, and a disk substrate. However, as information devices are being further miniaturized and display devices are providing higher resolution, more functions and greater performance are required from the material.

Therefore, there is a need to develop a colorless transparent material having improved transparency, heat resistance, mechanical strength, and flexibility.

SUMMARY

An embodiment provides a novel compound.

Another embodiment provides a polymer obtained by polymerizing the novel compound.

Yet another embodiment provides a film including the polymer.

Still another embodiment provides an optical device including the film.

An embodiment provides a compound represented by Chemical Formula 1:

Chemical Formula 1

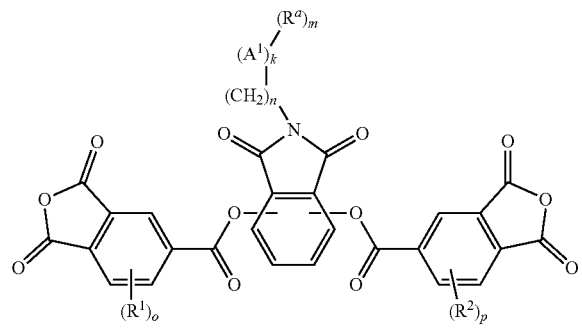

wherein, in Chemical Formula 1, $R^1$ and $R^2$ are independently a substituted or unsubstituted C1 to C30 alkyl group, a substituted or unsubstituted C1 to C30 alkoxy group, a substituted or unsubstituted C3 to C30 cycloalkyl group, a substituted or unsubstituted C6 to C30 aryl group, a substituted or unsubstituted C1 to C30 acyl group, a hydroxy group, a halogen, a nitro group, —NR'R", —SiR'R"R'" (wherein R', R", and R'" are independently hydrogen, a C1 to C30 alkyl group, or a C6 to C30 aryl group), or a combination thereof, o and p are independently an integer ranging from 0 to 3, $A^1$ is a C6 to C30 aromatic ring, $R^a$ is hydrogen, a substituted or unsubstituted C1 to C30 alkyl group, a substituted or unsubstituted C1 to C30 alkoxy group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C2 to C30 heteroaryl group, a hydroxy group, a halogen, a nitro group, —NR'R", —C(=O)—NR'R", —SiR'R"R'" (wherein R', R", and R'" are independently hydrogen, a C1 to C30 alkyl group, a C6 to C30 aryl group, or a C7 to C30 arylalkyl group), or a group represented by Chemical Formula 2:

Chemical Formula 2

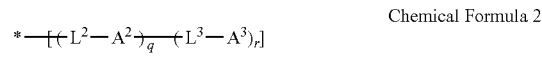

wherein, in Chemical Formula 2, $L^2$ and $L^3$ are independently 0, C(=O), C(=O)O, C≡C, or C(=O)NR$^b$ (wherein, R$^b$ is hydrogen or a C1 to C30 alkyl group), $A^2$ and $A^3$ are independently a substituted or unsubstituted C6 to C30 aromatic ring, a substituted or unsubstituted fluorene ring, or a substituted or unsubstituted C7 to C30 arylalkyl group, q and r are independently an integer ranging from 0 to 3, provided that q+r is an integer greater than or equal to 1, m is an integer greater than or equal to 1, and k and n are independently an integer greater than or equal to 0.

In Chemical Formula 1, o and p are independently 0 or 1, $A^1$ is a C6 to C20 aromatic ring, $R^a$ is hydrogen, a substituted or unsubstituted C1 to C20 alkyl group, a substituted or unsubstituted C1 to C20 alkoxy group, a substituted or unsubstituted C7 to C20 arylalkyl group, a substituted or unsubstituted C2 to C20 heteroaryl group, a halogen, —NR'R" (wherein R', and R" are independently hydrogen, a C1 to C30 alkyl group, a C6 to C30 aryl group, or a C7 to C30 arylalkyl group), or a group represented by Chemical Formula 2:

Chemical Formula 2

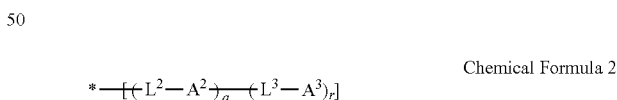

wherein, in Chemical Formula 2, $L^2$ and $L^3$ are independently C(=O)O, C≡C, or C(=O)NR$^b$ (wherein, R$^b$ is hydrogen or a C1 to C20 alkyl group), $A^2$ and $A^3$ are independently a substituted or unsubstituted C6 to C20 aromatic ring, a substituted or unsubstituted fluorene ring, or a substituted or unsubstituted C7 to C20 arylalkyl group, q and r are independently an integer ranging from 0 to 2, provided that 1≤q+r≤2, m is an integer ranging from 1 to 3, and k and n are independently an integer ranging from 0 to 10.

In Chemical Formula 1,
both o and p are 0,
$A^1$ is a benzene ring,
$R^a$ is hydrogen, a substituted or unsubstituted C1 to C20 alkyl group, a substituted or unsubstituted C1 to C20 alkoxy group, a substituted or unsubstituted C7 to C20 arylalkyl group, a substituted or unsubstituted C2 to C20 heteroaryl group, a halogen, or a group represented by Chemical Formula 2:

$$*-[(L^2-A^2)_{q}-(L^3-A^3)_r] \quad \text{Chemical Formula 2}$$

wherein, in Chemical Formula 2,
$L^2$ and $L^3$ are independently C(=O)O, C≡C, or C(=O)NR$^b$ (wherein, $R^b$ is hydrogen or a C1 to C20 alkyl group),
$A^2$ and $A^3$ are independently a substituted or unsubstituted benzene ring, a substituted or unsubstituted fluorene ring, or a substituted or unsubstituted C7 to C20 arylalkyl group,
q and r are independently an integer ranging from 0 to 2, provided that 1≤q+r≤2,
m is 1 or 2, and
k and n are independently an integer ranging from 0 to 3.

The compound represented by Chemical Formula 1 may be represented by Chemical Formula 3 or Chemical Formula 4:

Chemical Formula 3

[Structure with $(R^a)_m$, $(A^1)_k$, $(CH_2)_n$, $(R^1)_o$, $(R^2)_p$ substituents]

Chemical Formula 4

[Structure with $(R^a)_m$, $(A^1)_k$, $(CH_2)_n$, $(R^1)_o$, $(R^2)_p$ substituents]

wherein, in Chemical Formulae 3 and 4,
$R^1$ and $R^2$ are independently a substituted or unsubstituted C1 to C30 alkyl group, a substituted or unsubstituted C1 to C30 alkoxy group, a substituted or unsubstituted C3 to C30 cycloalkyl group, a substituted or unsubstituted C6 to C30 aryl group, a substituted or unsubstituted C1 to C30 acyl group, a hydroxy group, a halogen, a nitro group, —NR'R", —SiR'R"R'" (wherein R', R", and R'" are independently hydrogen, a C1 to C30 alkyl group, or a C6 to C30 aryl group), or a combination thereof,
o and p are independently an integer ranging from 0 to 3,
$A^1$ is a C6 to C30 aromatic ring,
$R^a$ is hydrogen, a substituted or unsubstituted C1 to C30 alkyl group, a substituted or unsubstituted C1 to C30 alkoxy group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C2 to C30 heteroaryl group, a hydroxy group, a halogen, a nitro group, —NR'R", —C(=O)—NR'R", —SiR'R"R'" (wherein R', R", and R'" are independently hydrogen, a C1 to C30 alkyl group, a C6 to C30 aryl group, or a C7 to C30 arylalkyl group), or a group represented by Chemical Formula 2:

$$*-[(L^2-A^2)_{q}-(L^3-A^3)_r] \quad \text{Chemical Formula 2}$$

wherein, in Chemical Formula 2,
$L^2$ and $L^3$ are independently 0, C(=O), C(=O)O, C≡C, or C(=O)NR$^b$ (wherein, $R^b$ is hydrogen or a C1 to C30 alkyl group),
$A^2$ and $A^3$ are independently a substituted or unsubstituted C6 to C30 aromatic ring, a substituted or unsubstituted fluorene ring, or a substituted or unsubstituted C7 to C30 arylalkyl group,
q and r are independently an integer ranging from 0 to 3, provided that q+r is an integer greater than or equal to 1,
m is an integer greater than or equal to 1, and
k and n are independently an integer greater than or equal to 0.

In Chemical Formulae 3 and 4,
o and p are independently 0 or 1,
$A^1$ is a C6 to C30 aromatic ring,
$R^a$ is hydrogen, a substituted or unsubstituted C1 to C20 alkyl group, a substituted or unsubstituted C1 to C20 alkoxy group, a substituted or unsubstituted C7 to C20 arylalkyl group, a substituted or unsubstituted C2 to C20 heteroaryl group, a halogen, —NR'R" (wherein R', and R" are independently hydrogen, a C1 to C30 alkyl group, a C6 to C30 aryl group, or a C7 to C30 arylalkyl group), or a group represented by Chemical Formula 2:

$$*-[(L^2-A^2)_{q}-(L^3-A^3)_r] \quad \text{Chemical Formula 2}$$

wherein, in Chemical Formula 2,
$L^2$ and $L^3$ are independently, C(=O)O, C≡C, or C(=O)NR$^b$ (wherein, $R^b$ is hydrogen or a C1 to C20 alkyl group),
$A^2$ and $A^3$ are independently a substituted or unsubstituted C6 to C20 aromatic ring, a substituted or unsubstituted fluorene ring, or a substituted or unsubstituted C7 to C20 arylalkyl group,
q and r are independently an integer ranging from 0 to 2, provided that 1≤q+r≤2,
m is an integer ranging from 1 to 3, and
k and n are independently an integer ranging from 0 to 10.

In Chemical Formulae 3 and 4,
both o and p are 0,
$A^1$ is a benzene ring,
$R^a$ is hydrogen, a substituted or unsubstituted C1 to C10 alkyl group, a substituted or unsubstituted C1 to C10 alkoxy group, a substituted or unsubstituted C2 to C10 heteroaryl group, a halogen, or a group represented by Chemical Formula 2:

Chemical Formula 2

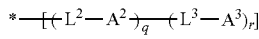

wherein, in Chemical Formula 2,
L² and L³ are independently, C(=O)O, C≡C, or C(=O)NR^b (wherein, R^b is hydrogen or a C1 to C20 alkyl group),
A² and A³ are independently a substituted or unsubstituted benzene ring, a substituted or unsubstituted fluorene ring, or a substituted or unsubstituted C7 to C20 arylalkyl group,
q and r are independently an integer ranging from 0 to 2, provided that 1≤q+r≤2,
m is 1 or 2, and
k and n are independently an integer ranging from 0 to 3.
In another embodiment, a polymer is a reaction product of reactants that includes the compound according to the embodiment and a diamine.
The diamine may be represented by Chemical Formula 5:

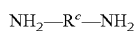      Chemical Formula 5 wherein in Chemical Formula 5,
R^c is a substituted or unsubstituted C6 to C30 aromatic organic group, wherein the substituted or unsubstituted C6 to C30 aromatic organic group is present as a substituted or unsubstituted single aromatic ring; a fused ring including two or more substituted or unsubstituted aromatic rings; or a ring system including two or more of the substituted or unsubstituted single aromatic ring and/or the fused ring that are linked by a single bond, or a functional group selected from a fluorenylene group, a substituted or unsubstituted C1 to C10 cycloalkylene group, a substituted or unsubstituted C6 to C15 arylene group, —O—, —S—, —C(=O)—, —CH(OH)—, —S(=O)₂—, —Si(CH₃)₂—, —(CH₂)$_p$— (wherein, 1≤p≤10), —(CF₂)$_q$— (wherein, 1≤q≤10), —C(CH₃)₂—, —C(CF₃)₂—, —C(=O)NH—, or a combination thereof.

The diamine represented by Chemical Formula 5 may be represented by at least one of Chemical Formula 6 to Chemical Formula 8:

Chemical Formula 6

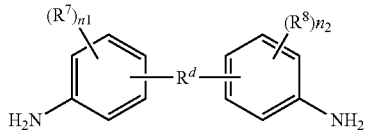

wherein, in Chemical Formula 6,
R^d is selected from the following chemical formulae:

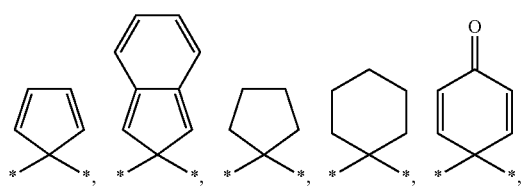

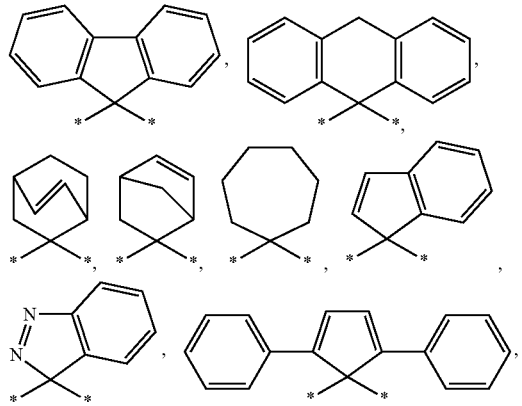

R⁷ and R⁸ are the same or different and are independently a halogen, a hydroxy group, an alkoxy group (—OR²⁰⁰, wherein R²⁰⁰ is a C1 to C10 aliphatic organic group), a silyl group (—SiR²⁰¹R²⁰²R²⁰³, wherein R²⁰¹, R²⁰², and R²⁰³ are the same or different and are independently hydrogen or a C1 to C10 aliphatic organic group), a substituted or unsubstituted C1 to C10 aliphatic organic group, or a substituted or unsubstituted C6 to C20 aromatic organic group, and
n1 and n2 are independently an integer ranging from 0 to 4;

Chemical Formula 7

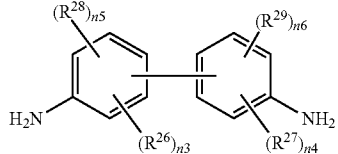

wherein, in Chemical Formula 7,
R²⁶ and R²⁷ are the same or different and are independently an electron withdrawing group selected from —CF₃, —CCl₃, —CBr₃, —Cl₃, —NO₂, —CN, —COCH₃, or —CO₂C₂H₅,
R²⁸ and R²⁹ are the same or different and are independently a halogen, a hydroxy group, an alkoxy group (—OR²⁰⁴, wherein R²⁰⁴ is a C1 to C10 aliphatic organic group), a silyl group (—SiR²⁰⁵R²⁰⁶R²⁰⁷, wherein R²⁰⁵, R²⁰⁶, and R²⁰⁷ are the same or different and are independently hydrogen or a C1 to C10 aliphatic organic group), a substituted or unsubstituted C1 to C10 aliphatic organic group, or a substituted or unsubstituted C6 to C20 aromatic organic group,
n3 is an integer ranging from 1 to 4, and n5 is an integer ranging from 0 to 3, provided that n3+n5 is an integer ranging from 1 to 4, and
n4 is an integer ranging from 1 to 4, and n6 is an integer ranging from 0 to 3, provided that n4+n6 is an integer ranging from 1 to 4;

Chemical Formula 8

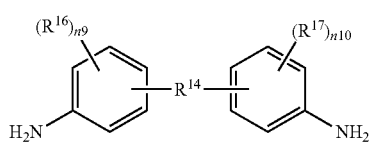

wherein, in Chemical Formula 8, $R^{14}$ includes O, S, C(=O), CH(OH), S(=O)$_2$, Si(CH$_3$)$_2$, (CH$_2$)$_p$ (wherein, 1≤p≤10), (CF$_2$)$_q$ (wherein, 1≤q≤10), C(CH$_3$)$_2$, C(CF$_3$)$_2$, C(=O)NH, or a substituted or unsubstituted C6 to C18 aromatic organic group, wherein the substituted or unsubstituted C6 to C18 aromatic organic group is present as a single aromatic ring, a fused ring including two or more aromatic rings, or a ring system including two or more of the single aromatic ring and/or the fused ring that are linked by a single bond or a functional group selected from a fluorenylene group, O, S, C(=O), CH(OH), S(=O)$_2$, Si(CH$_3$)$_2$, (CH$_2$)$_p$ (wherein, 1≤p≤10), (CF$_2$)$_q$ (wherein, 1≤q≤10), C(CH$_3$)$_2$, C(CF$_3$)$_2$, or C(=O)NH, $R^{16}$ and $R^{17}$ are the same or different and are independently a halogen, a hydroxy group, an alkoxy group (—OR$^{212}$, wherein $R^{212}$ is a C1 to C10 aliphatic organic group), a silyl group (—SiR$^{213}$R$^{214}$R$^{215}$, wherein $R^{213}$, $R^{214}$, and $R^{215}$ are the same or different and are independently hydrogen or a C1 to C10 aliphatic organic group), a substituted or unsubstituted C1 to C10 aliphatic organic group, or a substituted or unsubstituted C6 to C20 aromatic organic group, and n9 and n10 are independently an integer ranging from 0 to 4.

The diamine represented by Chemical Formula 5 may include at least one of the diamine represented by Chemical Formula 7 and the diamine represented by Chemical Formula 8.

The diamine represented by Chemical Formula 7 may include 2,2'-bis(trifluoromethyl)benzidine (TFDB), and the diamine represented by Chemical Formula 8 may include 4,4'-diaminodiphenyl sulfone (DADPS).

The polymer may be a reaction product of reactants that further includes a dianhydride represented by Chemical Formula 9:

Chemical Formula 9

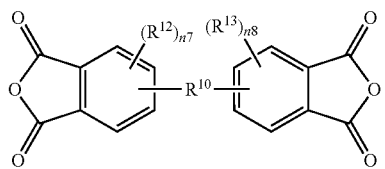

wherein in Chemical Formula 9, $R^{10}$ is a single bond, —O—, —S—, —C(=O)—, —CH(OH)—, —C(=O)NH—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, or —(CH$_2$)$_p$—C(C$_n$F$_{2n+1}$)$_2$—(CH$_2$)$_q$— (wherein 1≤n≤10, 1≤p≤10, and 1≤q≤10), $R^{12}$ and $R^{13}$ are independently a halogen, a hydroxy group, a substituted or unsubstituted C1 to C10 aliphatic organic group, a substituted or unsubstituted C6 to C20 aromatic organic group, a —OR$^{201}$ group (wherein R$^{201}$ is a C1 to C10 aliphatic organic group), or a —SiR$^{210}$R$^{211}$R$^{212}$ (wherein R$^{210}$, R$^{211}$ and R$^{212}$ are independently hydrogen or a C1 to C10 aliphatic organic group) group, and n7 and n8 are independently one of integers of 0 to 3.

The dianhydride represented by Chemical Formula 9 may include a dianhydride represented by Chemical Formula 10, a dianhydride represented by Chemical Formula 11, or a combination thereof:

Chemical Formula 10

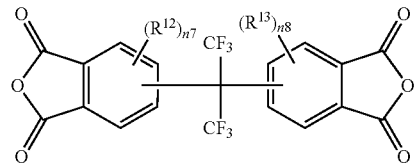

Chemical Formula 11

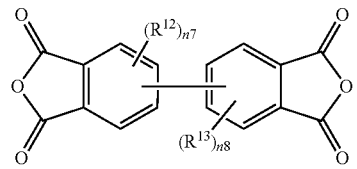

wherein, in Chemical Formula 10 and Chemical Formula 11, $R^{12}$ and $R^{13}$ are the same or different and are independently a halogen, a hydroxy group, an alkoxy group (—OR$^{208}$, wherein $R^{208}$ is a C1 to C10 aliphatic organic group), a silyl group (—SiR$^{209}$R$^{210}$R$^{211}$, wherein $R^{209}$, $R^{210}$, and $R^{211}$ are the same or different and are independently hydrogen or a C1 to C10 aliphatic organic group), a substituted or unsubstituted C1 to C10 aliphatic organic group, or a substituted or unsubstituted C6 to C20 aromatic organic group, and n7 and n8 are independently an integer ranging from 0 to 3.

The polymer may be a reaction product of reactants that further include at least one of the dianhydride represented by Chemical Formula 10 and the dianhydride represented by Chemical Formula 11 in an amount of about 1 mole percent to about 99 mole percent based on the total mole number of the dianhydrides.

The polymer may be a reaction product of reactants that further includes a dicarboxylic acid derivative represented by Chemical Formula 12:

Chemical Formula 12

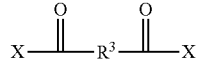

wherein, in Chemical Formula 12, $R^3$ is at least one of a substituted or unsubstituted phenylene group and a substituted or unsubstituted biphenylene group, and each X is the same or different and is a halogen atom.

In Chemical Formula 12, $R^3$ may be at least one of an unsubstituted phenylene group and an unsubstituted biphenylene group, and X may independently be Cl or Br.

Another embodiment provides a film including the polymer according to the embodiment.

The film may be a compensation film.

Another embodiment provides an optical device that includes the film according to the embodiment.

The optical device may be a display device.

Hereinafter, the embodiments are described in detail.

A novel compound, according to an embodiment, reacts with a diamine, and thus, may be used to form a polyester imide film having a high transmittance, a low yellow index, and a low haze, as well as a high out-of-plane birefringence. The novel compound is prepared from inexpensive raw materials, and may be used to manufacture a film, such as, for example, an optical film, a window film, and the like, requiring good optical and mechanical characteristics, as well as high heat resistance.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
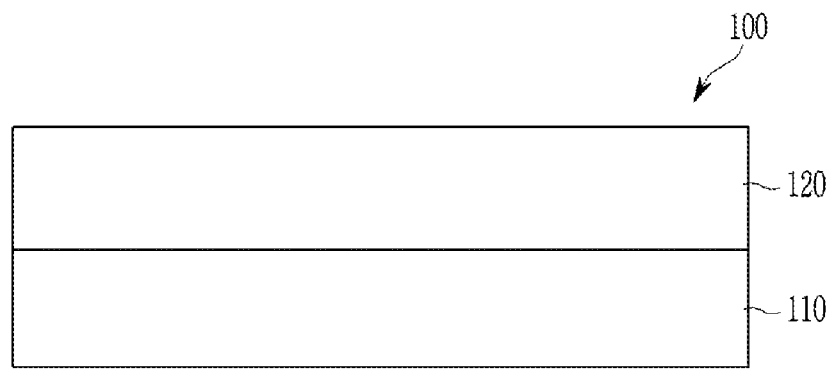
FIG. 1 is a schematic cross-sectional view of an optical film, according to an embodiment.

Hereinafter, exemplary embodiments will be described in detail, and may be readily performed by those who have common knowledge in the related art. However, this disclosure may be embodied in many different forms and should not be construed as limited to the exemplary embodiments set forth herein.

Accordingly, the embodiments are merely described below, by referring to the figures, to explain aspects of the present description. As used herein, the term "and/or" includes any and all combinations of one or more of the associated listed items. The term "or" means "and/or." Expressions such as "at least one of" when preceding a list of elements, modify the entire list of elements and do not modify the individual elements of the list.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or non-linear features. Moreover, sharp angles that are illustrated may be rounded. Thus, the regions illustrated in the figures are schematic in nature and their shapes are not intended to illustrate the precise shape of a region and are not intended to limit the scope of the present claims.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

As used herein, when a definition is not otherwise provided, the term "substituted" refers to replacement of a hydrogen atom of a compound or a functional group by a substituent selected from a halogen atom, a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C7 to C30 arylalkyl group, a C1 to C30 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C3 to C30 heterocycloalkyl group, and a combination thereof.

As used herein, when a definition is not otherwise provided, the term "hetero" refers to inclusion of 1 to 3 hetero atoms selected from N, O, S, Se, and P.

As used herein, when a definition is not otherwise provided, the term "alkyl" indicates a group derived from a completely saturated, branched or unbranched (or a straight or linear) hydrocarbon and having a specified number of carbon atoms.

As used herein, the term "cycloalkyl group" refers to a monovalent group having one or more saturated rings in which all ring members are carbon. Non-limiting examples of the cycloalkyl group are cyclopentyl and cyclohexyl.

As used herein, when a definition is not otherwise provided, the term "alkoxy" represents "alkyl-O—", wherein the term "alkyl" has the same meaning as described above.

As used herein, when a definition is not otherwise provided, the term "cycloalkoxy" represents "cycloalkyl-O—", wherein the term "cycloalkyl" has the same meaning as described above.

As used herein, when a definition is not otherwise provided, the term "aryl" indicates an aromatic hydrocarbon containing at least one ring and having the specified number of carbon atoms.

As used herein, when a definition is not otherwise provided, the term "arylalkyl" represents "aryl-alkyl-", wherein the terms "aryl" and "alkyl" have the same meaning as described above.

As used herein, the term "alkylene" indicates a group having one or more saturated rings in which all ring members are carbon having a valence of at least two, optionally substituted with one or more substituents where indicated, provided that the valence of the cycloalkylene group is not exceeded.

As used herein, the term "cycloalkylene" indicates a straight or branched saturated aliphatic hydrocarbon group having a valence of at least two, optionally substituted with one or more substituents where indicated, provided that the valence of the alkylene group is not exceeded.

As used herein, when a definition is not otherwise provided, the term "arylene" indicates a divalent group formed by the removal of two hydrogen atoms from one or more rings of an arene, wherein the hydrogen atoms may be removed from the same or different rings of the arene.

An optically transparent heat resistant polymer described herein may be applied to various optoelectronic devices, for example, an image device, a liquid crystal alignment layer, a color filter, an optical compensation film, an optic fiber, a light guide, optical lens, and the like. In this regard, research efforts have been recently undertaken to produce a remarkably light and flexible display panel by replacing a fragile inorganic glass substrate (e.g., about 300 nanometers (nm) to about 700 millimeters (mm) thick) in an image device with a plastic substrate (<about 50 mm thick) has drawn attention.

However, the plastic substrate has not secured reliability yet, because it is difficult to simultaneously achieve optical transmittance, heat resistance, dimensional stability (thermal dimensional stability) at a thermal cycle during the assembly process of a device, film flexibility, and film-forming process compatibility (a solution process) at a high level. The plastic substrate is excellent in terms of flexibility and thin film formality, but inferior in terms of heat resistance and thermal dimensional stability compared with the inorganic glass substrate.

Poly(ether sulfone) (PES) is known to have the highest glass transition temperature ($T_g$, 225° C.) among commercially available super engineering plastics. However, PES may be unsuitable for the plastic substrate in terms of heat resistance and thermal dimensional stability. A plastic substrate having insufficient thermal dimensional stability may be thermally expanded/contracted during repetitive heating/cooling cycles in a process of forming an ITO (indium tin oxide) electrode and a thin film transistor, and thus, may cause a serious problem of destroying an ITO layer.

A high temperature polymer material having the highest reliability may be polyimide (PI). A part of aromatic PI systems simultaneously has much higher $T_g$ than a device operating temperature and a low linear coefficient of thermal expansion (CTE) along a film plane (X-Y) direction in a glassy region, and thus, excellent thermal dimensional stability. However, common aromatic PI is strongly colored due to a charge transfer (CT) interaction and often disturbs an optical device. Accordingly, academic and industrial research efforts on a coloring/discoloring mechanism of an aromatic PI film have been widely undertaken. One of the effective approaches for discoloring the film is to block the CT interaction by selecting a non-aromatic (alicyclic) monomer from diamine, tetracarboxylic dianhydride, or both of them. However, the alicyclic monomer may cause a serious problem in some uses. In other words, a partly or wholly alicyclic PI film often has insufficient thermal dimensional stability due to a high linear coefficient of thermal expansion CTE (>60 parts per million per Kelvin (ppm $K^{-1}$)) in the glassy region despite a high glass transition temperature $T_g$ (>300° C.). This high linear coefficient of thermal expansion is actually generated from a randomly three dimensionally disposed chain alignment. The alicyclic monomer mostly has a non-linear/non-planar cubic structure. As a result, linearity of a PI main chain is completely destroyed. In this twisted backbone structure, chains may not be highly aligned along an X-Y direction (hereinafter, "planar alignment") during a thermal imidization process. Among the alicyclic monomers, 1,2,3,4-cyclobutane tetracarboxylic dianhydride (CBDA) and trans-1,4-cyclohexane diamine (t-CHDA) uncommonly has a rigid and linear structure. However, a final PI using this monomer may not be applied to a solution process. A wholly aromatic PI system induced from 4,4'-(hexafluoroisopropylidene) diphthalic anhydride (6FDA) and 2,2'-bis(trifluoromethyl)benzidine (TFMB) has no low coefficient of thermal expansion due to a non-linear/non-coplanar cubic structure of a 6-FDA-based diimide unit but high transparency and excellent solubility. However, the PI prepared from TFMB and 6FDA has a high glass transition temperature ($T_g$>300° C.), a low birefringence ($\Delta n_{th}$) due to the non-linear/non-coplanar cubic structure of a 6-FDA-based diimide unit, and a high price.

Accordingly, a plastic material simultaneously satisfying desired various characteristics, and thus, having high reliability is difficult to develop.

The present inventors synthesize a novel compound capable of forming a polyimide simultaneously satisfying thermal stability and optical transparency, and thus, have completed the present inventive concept by confirming that a polymer formed from the compound has particular optical properties, such as, for example, a high out-of-plane birefringence along with a high transparency, and a low glass transition temperature ($T_g$<250° C.) along with a sufficient heat-resistance, such that the polymer can be applied to a solution process. The compound may be represented by Chemical Formula 1:

Chemical Formula 1

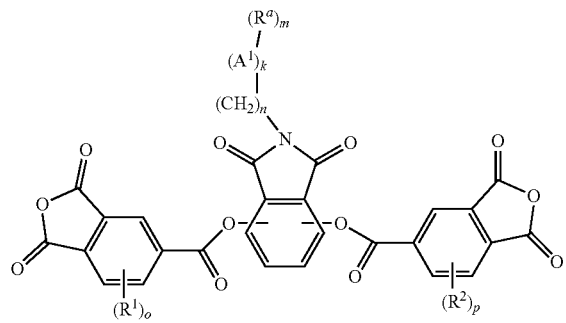

wherein, in Chemical Formula 1, $R^1$ and $R^2$ are independently a substituted or unsubstituted C1 to C30 alkyl group, a substituted or unsubstituted C1 to C30 alkoxy group, a substituted or unsubstituted C3 to C30 cycloalkyl group, a substituted or unsubstituted C6 to C30 aryl group, a substituted or unsubstituted C1 to C30 acyl group, a hydroxy group, a halogen, a nitro group, —NR'R", —SiR'R"R''' (wherein R', R", and R''' are independently hydrogen, a C1 to C30 alkyl group, or a C6 to C30 aryl group), or a combination thereof, o and p are independently an integer ranging from 0 to 3, $A^1$ is a C6 to C30 aromatic ring, $R^a$ is hydrogen, a substituted or unsubstituted C1 to C30 alkyl group, a substituted or unsubstituted C1 to C30 alkoxy group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C2 to C30 heteroaryl group, a hydroxy group, a halogen, a nitro group, —NR'R", —C(=O)—NR'R", —SiR'R"R''' (wherein R', R", and R''' are independently hydrogen, a C1 to C30 alkyl group, a C6 to C30 aryl group, or a C7 to C30 arylalkyl group), or a group represented by Chemical Formula 2:

Chemical Formula 2

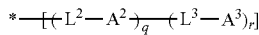

wherein, in Chemical Formula 2, $L^2$ and $L^3$ are independently O, C(=O), C(=O)O, C≡C, or C(=O)$NR^b$ (wherein, $R^b$ is hydrogen or a C1 to C30 alkyl group), $A^2$ and $A^3$ are independently a substituted or unsubstituted C6 to C30 aromatic ring, a substituted or unsubstituted fluorene ring, or a substituted or unsubstituted C7 to C30 arylalkyl group, q and r are independently an integer ranging from 0 to 3, provided that q+r is an integer greater than or equal to 1, m is an integer greater than or equal to 1, and k and n are independently an integer greater than or equal to 0.

The compound represented by Chemical Formula 1, according to an embodiment, has an overall rigid planar structure, wherein each of two dianhydride groups is linked to the core of the compound via a carbonyl group (C=O), and also, includes a bulky substituent at a side chain of the core, and thus, may have improved solubility due to a much higher molecular volume and an asymmetric structure. In addition, the compound represented by Chemical Formula 1 may have improved optical characteristics by suppressing formation of an intermolecular stacking structure of a polyimide or poly(amide-imide) copolymer and decreasing charge transfer.

The rigid planar structure has a much lower linear coefficient of thermal expansion, a high glass transition temperature, a high out-of-plane birefringence, high mechanical properties, and the like, but may easily form an intermolecular stacking structure, and thus, form an intermolecular charge transfer complex. Accordingly, a polymer formed therefrom appears yellow and deteriorates optical properties. In addition, a dense intermolecular stacking structure may not allow a solution processing. The compound represented by Chemical Formula 1 according to the embodiment has a rigid planar structure overall, but includes a bulky substituent at a side chain of the core, and thus, may suppress formation of a complex among polymer chains and a charge transfer complex therefrom, reduce a deterioration of optical properties, and simultaneously maintain high thermal stability, a low linear coefficient of thermal expansion, a high out-of-plane birefringence, and excellent mechanical properties due to the overall planar structure. Accordingly, a polyester-imide (PEI) prepared by reacting the novel dianhydride according to an embodiment, wherein both the dianhydride groups are linked to the core through a carbonyl group to form an ester structure, with an aromatic diamine, may satisfy high thermal stability and excellent optical properties. Furthermore, the compound according to the embodiment may be prepared from easily available inexpensive starting materials, as shown through Examples that will be described later, and thus, may lower a preparation cost compared with a conventional particularly expensive aromatic diamine or an aromatic dianhydride showing excellent optical properties, mechanical properties, and the like.

In an exemplary embodiment, o and p of Chemical Formula 1 may independently be an integer of 0 or 1, $A^1$ may be a C6 to C30 aromatic ring, for example, a C6 to C20 aromatic ring, for example, a C6 to C12 aromatic ring, for example, a C6 to C10 aromatic ring, or for example, a benzene ring, and $R^a$ may be hydrogen, a substituted or unsubstituted C1 to C20 alkyl group, a substituted or unsubstituted C1 to C20 alkoxy group, a substituted or unsubstituted C7 to C20 arylalkyl group, a substituted or unsubstituted C2 to C20 heteroaryl group, a halogen, —NR'R" (wherein R', and R" are independently hydrogen, a C1 to C30 alkyl group, a C6 to C30 aryl group, or a C7 to C30 arylalkyl group), or a group represented by Chemical Formula 2:

Chemical Formula 2

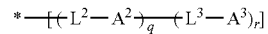

wherein, in Chemical Formula 2, $L^2$ and $L^3$ may independently be C(=O)O, C≡C, or C(=O)$NR^b$ (wherein, $R^b$ is hydrogen or a C1 to C20 alkyl group), for example, C(=O)O, C≡C, or C(=O)$NR^b$ (wherein, $R^b$ is hydrogen or a C1 to C20 alkyl group), or for example, C(=O)O, C≡C, or C(=O)NH, $A^2$ and $A^3$ may independently be a substituted or unsubstituted C6 to C20 aromatic ring, for example, a substituted or unsubstituted C6 to C16 aromatic ring, for example, a substituted or unsubstituted C6 to C12 aromatic ring, or for example, a benzene ring, a substituted or unsubstituted fluorene ring, or a substituted or unsubstituted C7 to C30 arylalkyl group, for example, a substituted or unsubstituted phenylalkyl group, for example, a phenylmethyl group, a phenylethyl group, a phenylpropyl group, a phenylbutyl group, or a phenylpentyl group, q and r may independently be an integer ranging from 0 to 2, provided $1 \leq q+r \leq 2$, m may be an integer ranging from 1 to 3, for example, 1 or 2, and k and n may independently be an integer ranging from 0 to 10, for example, 0 to 5, for example, 0 to 3, for example, 0 to 2, for example, 0 or 1, or for example, both k and n may be 0.

The compound represented by Chemical Formula 1 may be represented by Chemical Formula 3 or Chemical Formula 4:

Chemical Formula 3

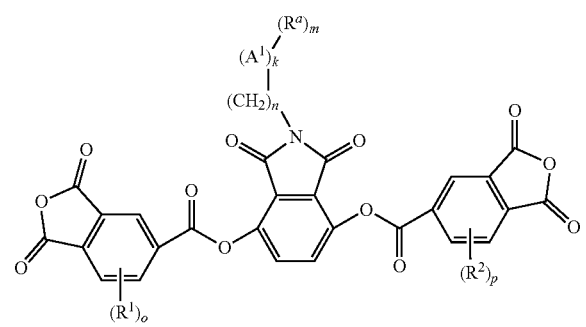

Chemical Formula 4

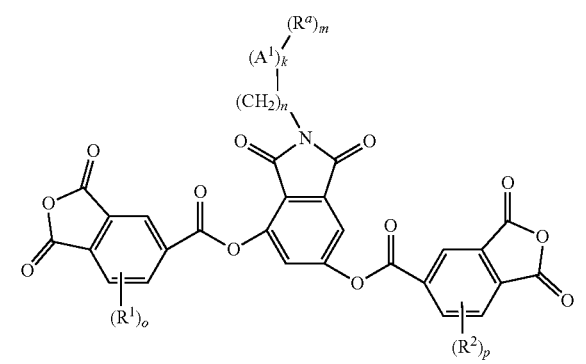

wherein, in Chemical Formula 3 and Chemical Formula 4, $R^1$ and $R^2$ may independently be a substituted or unsubstituted C1 to C30 alkyl group, a substituted or unsubstituted C1 to C30 alkoxy group, a substituted or unsubstituted C3 to C30 cycloalkyl group, a substituted or unsubstituted C6 to C30 aryl group, a substituted or unsubstituted C1 to C30 acyl group, a hydroxy group, a halogen, a nitro group, —NR'R", —SiR'R"R'" (wherein R', R", and R'" are independently hydrogen, a C1 to C30 alkyl group, or a C6 to C30 aryl group), or a combination thereof, o and p may independently be an integer ranging from 0 to 3, for example, 0 or 1, or for example, both o and p may be 0, $A^1$ is a C6 to C30 aromatic ring, for example, a C6 to C20 aromatic ring, for example, a C6 to C16 aromatic ring, for example, a C6 to C12 aromatic ring, or for example, a benzene ring, $R^a$ may be hydrogen, a substituted or unsubstituted C1 to C30 alkyl group, a substituted or unsubstituted C1 to C30 alkoxy group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C2 to C30 heteroaryl group, a hydroxy group, a halogen, a nitro group, —NR'R", —C(=O)—NR'R", —SiR'R"R'" (wherein R', R", and R'" are independently hydrogen, a C1 to C30 alkyl group, a C6 to C30 aryl group, or a C7 to C30 arylalkyl group), or a group represented by Chemical Formula 2:

Chemical Formula 2

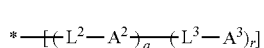

wherein, in Chemical Formula 2, $L^2$ and $L^3$ may independently be 0, C(=O), C(=O)O, C≡C, or C(=O)NR$^b$ (wherein, R$^b$ is hydrogen or a C1 to C20 alkyl group), for example, C(=O)O, C≡C, or C(=O)NR$^b$ (wherein, R$^b$ is hydrogen or a C1 to C20 alkyl group), or for example, C(=O)O, C≡C, or C(=O)NH, $A^2$ and $A^3$ may independently be a substituted or unsubstituted C6 to C30 aromatic ring, for example, a substituted or unsubstituted C6 to C16 aromatic ring, for example, a substituted or unsubstituted C6 to C12 aromatic ring, for example, a substituted or unsubstituted C6 to C10 aromatic ring, or for example, a benzene ring, a substituted or unsubstituted fluorene ring, for example, an unsubstituted fluorene ring, or a substituted or unsubstituted C7 to C30 arylalkyl group, for example, a substituted or unsubstituted phenylmethyl group, a substituted or unsubstituted phenylethyl group, a substituted or unsubstituted phenylpropyl group, a substituted or unsubstituted phenylbutyl group, or a substituted or unsubstituted phenylpentyl group, q and r may independently be an integer ranging from 0 to 3, provided that q+r is greater than or equal to 1, or for example, q and r may independently be an integer ranging from 0 to 2, provided that $1 \leq q+r \leq 2$, m may be an integer of greater than or equal to 1, for example, an integer ranging from 1 to 3, for example, 1 or 2, or for example, 1, and k and n may independently be an integer ranging from 0 to 10, for example, 0 to 5, for example, 0 to 3, for example, 0 to 2, for example, 0 or 1, or for example, both k and n may be 0.

In Chemical Formulae 3 and 4, o and p may independently be 0 or 1, for example, both o and p may be 0, $A^1$ may be a C6 to C20 aromatic ring, for example, a benzene ring, $R^a$ may be hydrogen, a substituted or unsubstituted C1 to C10 alkyl group, a substituted or unsubstituted C1 to C10 alkoxy group, a halogen, —NR'R" (wherein R', and R" are independently hydrogen, a C1 to C30 alkyl group, a C6 to C30 aryl group, or a C7 to C30 arylalkyl group), or a group represented by Chemical Formula 2:

Chemical Formula 2

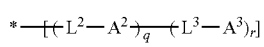

wherein, in Chemical Formula 2, $L^2$ and $L^3$ may independently be C(=O)O, C≡C, or C(=O)NR$^b$ (wherein, R$^b$ is hydrogen or a C1 to C20 alkyl group), $A^2$ and $A^3$ may independently be a benzene ring, a substituted or unsubstituted fluorene ring, or a substituted or unsubstituted C7 to C20 arylalkyl group, q and r may independently be an integer ranging from 0 to 2, provided that $1 \leq q+r \leq 2$, m may be an integer ranging from 1 to 3, and k and n may independently be an integer ranging from 0 to 10.

In Chemical Formulae 3 and 4, both o and p may be 0, $A^1$ may be a benzene ring, $R^a$ may be hydrogen, a substituted or unsubstituted C1 to C10 alkyl group, a substituted or unsubstituted C6 to C20 aryl group, a substituted or unsubstituted C2 to C10 heteroaryl group, or a group represented by Chemical Formula 2:

Chemical Formula 2

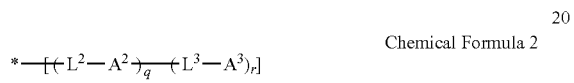

wherein, in Chemical Formula 2, $L^2$ and $L^3$ may independently be C(=O)O, C≡C, or C(=O)NH, $A^2$ and $A^3$ may independently be a benzene ring, a fluorene ring, or a C7 to C20 arylalkyl group, q and r may independently be an integer of 0 or 1, provided that $0 \leq q+r \leq 1$, m may be 1, and k and n may independently be an integer ranging from 0 to 3.

Examples of the compound, according to an embodiment, may be the compounds represented by Compounds P-1 to P-8, but are not limited thereto:

Compound P-1

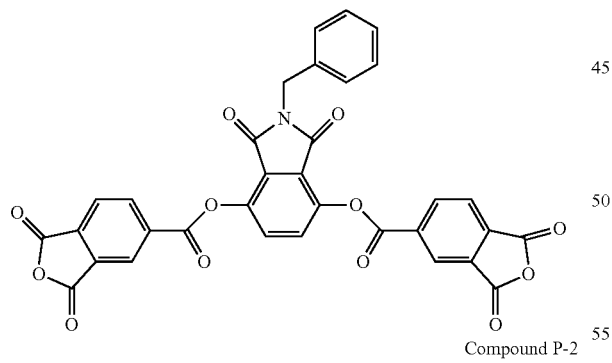

Compound P-2

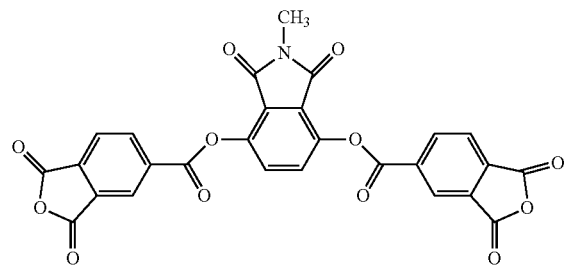

Compound P-3

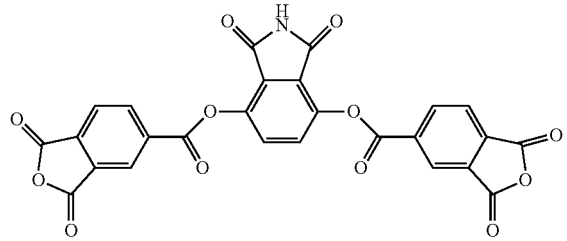

Compound P-4

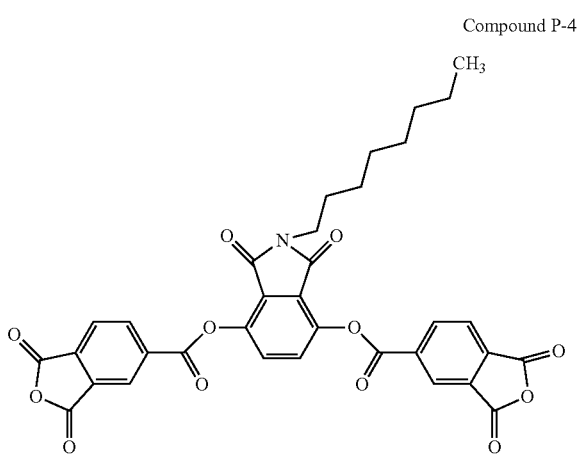

Compound P-5

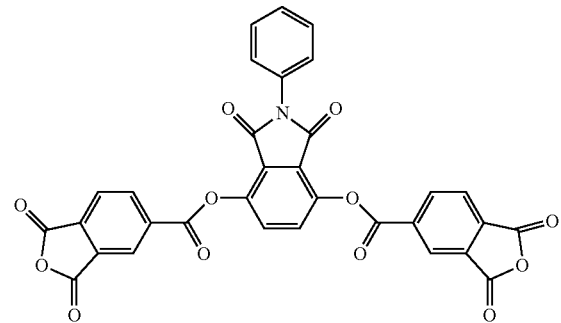

Compound P-6

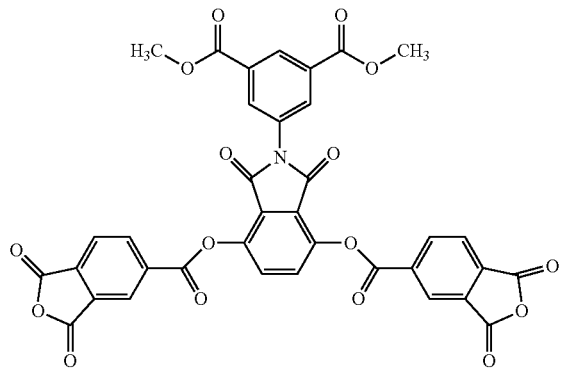

Compound P-8

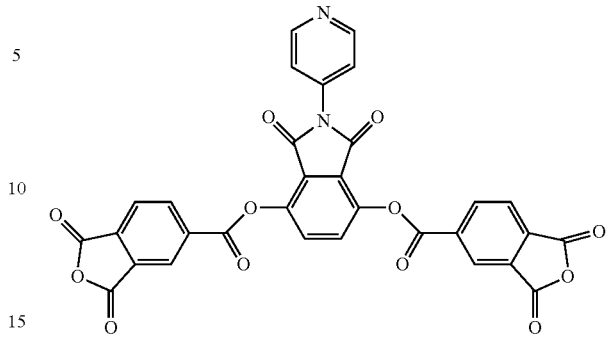

Compound P-7

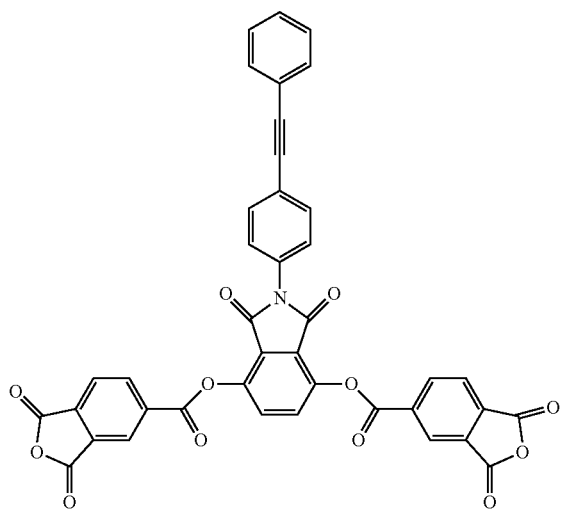

The compound represented by Chemical Formula 1, according to an embodiment, may be prepared from 2,3-dicarboxylic hydroquinone, or prepared by dissolving phthalic anhydride, which is commercially available, in an organic solvent, such as, for example, DMAc (dimethylacetamide), etc., adding an amine compound, such as, for example, a compound having an amino group at one end and a substituted or unsubstituted C1 to C30 alkyl group, a substituted or unsubstituted C1 to C30 alkoxy group, a substituted or unsubstituted C3 to C30 cycloalkyl group, a substituted or unsubstituted C6 to C30 aryl group, a substituted or unsubstituted C7 to C30 arylalkyl group, or a substituted or unsubstituted C2 to C30 heteroaryl group at the other end, a hydroxyl amine, a halogenated amine, a nitro amine, or a silyl amine to the solution to react, obtaining phthalic imide, and esterifying the two hydroxyl groups substituted to the phthalic imide with trimellitic anhydride chloride.

For example, Compound P-1 may be prepared as depicted in Reaction Scheme 1:

Reaction Scheme 1

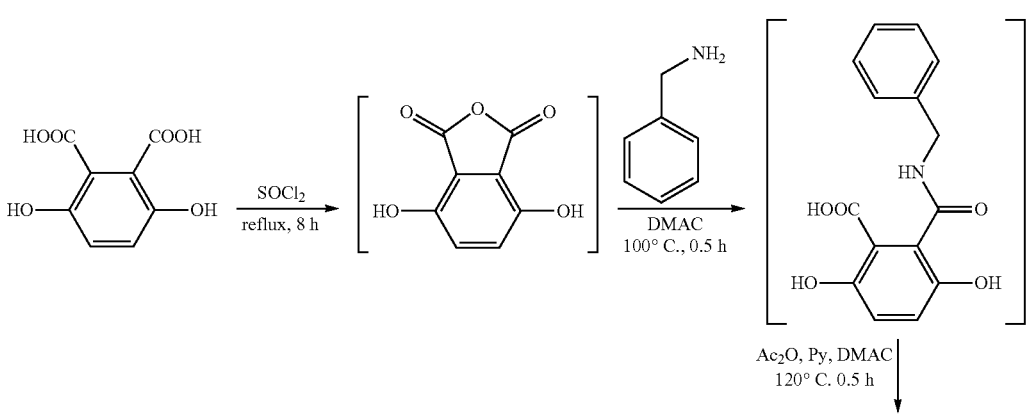

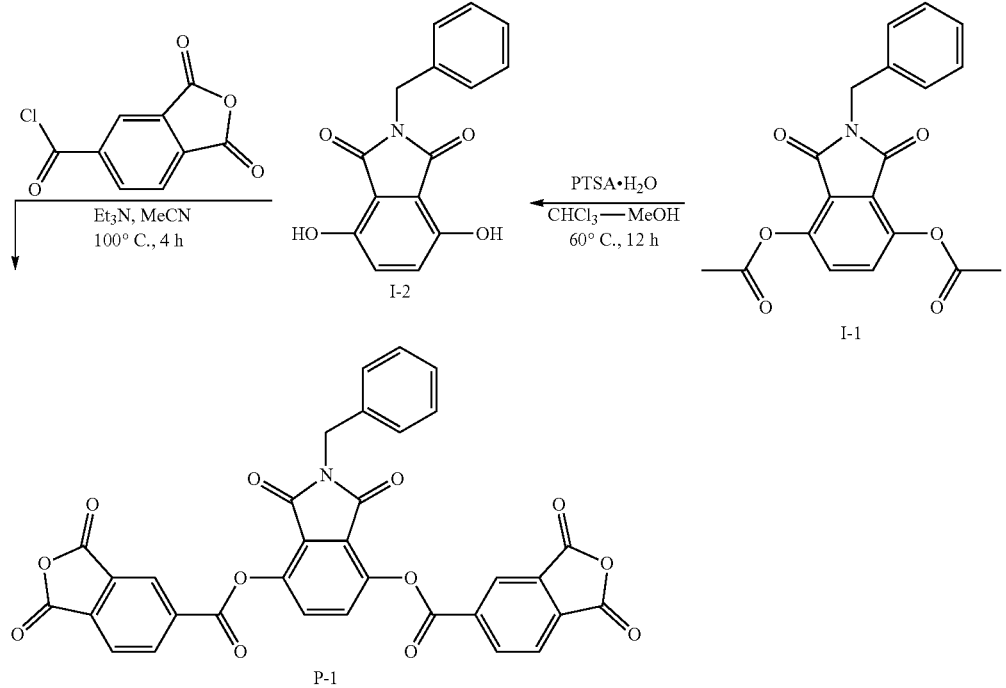

In Reaction Scheme 1, "PTSA" indicates "para-toluene sulfonic acid", "DMAC" indicates the solvent "dimethylacetamide", and "MeCN" indicates "methyl cyanide" or "acetonitrile".

As depicted in Reaction Scheme 1, the compound according to an embodiment may be prepared from phthalic anhydride, which is inexpensive and commercially easily available, or is able to be easily prepared by using a method well-known to persons skilled in the art from an inexpensive commercially available material, reacting phthalic anhydride with an amine compound having a desired substituent to obtain a phthalic imide, and esterifying the two hydroxyl groups attached to the benzene ring of the phthalic imide with trimellitic anhydride chloride. That is, the compound represented by Chemical Formula 1, which may have various substituents for various desired objects, may be easily prepared by merely imidizing phthalic anhydride with an amine compound having a desired substituent.

The compound according to an embodiment is a dianhydride compound, which has two anhydrides at both ends, and thus, may be able to react with a diamine compound in the same mole amount to form a polyimide. Further, the compound has a core connected to the two anhydrides through each ester bond, and thus, the polymer prepared by reacting with a diamine may be a polyester-imide (PEI).

Accordingly, in another embodiment, a polymer, a product of reactants including the compound according to the embodiment and a diamine is provided.

The diamine may be represented by Chemical Formula 5:

$NH_2—R^c—NH_2$   Chemical Formula 5 wherein, in Chemical Formula 5, $R^c$ is a substituted or unsubstituted C6 to C30 aromatic organic group, wherein the substituted or unsubstituted C6 to C30 aromatic organic group is present as a substituted or unsubstituted single aromatic ring; a fused ring including two or more substituted or unsubstituted aromatic rings; or a ring system including two or more of the substituted or unsubstituted single aromatic ring and/or the fused ring that are linked by a single bond, or a functional group of a fluorenylene group, a substituted or unsubstituted C1 to C10 cycloalkylene group, a substituted or unsubstituted C6 to C15 arylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, —C(=O)NH—, or a combination thereof.

A polymer prepared by reacting the compound, according to an embodiment, with the diamine represented by Chemical Formula 5 may include a first imide structural unit represented by Chemical Formula 13:

Chemical Formula 13

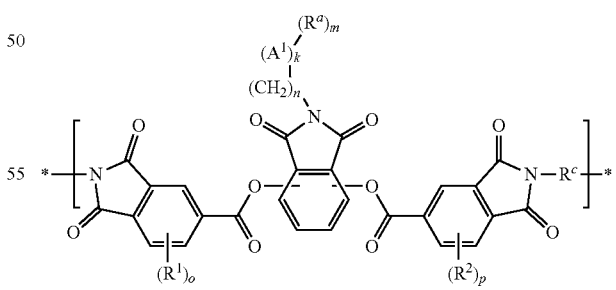

wherein, in Chemical Formula 13, $R^a$, $A^1$, m, k, n, $R^1$, $R^2$, o, and p are the same as defined in Chemical Formula 1, and $R^c$ is the same as defined in Chemical Formula 5.

When the compound, according to an embodiment, is represented by Chemical Formula 3, the first imide structural unit may be represented by Chemical Formula 14:

Chemical Formula 14

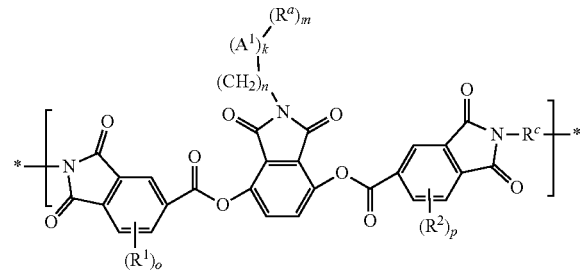

When the compound, according to an embodiment, is represented by Chemical Formula 4, the first imide structural unit may be represented by Chemical Formula 15:

Chemical Formula 15

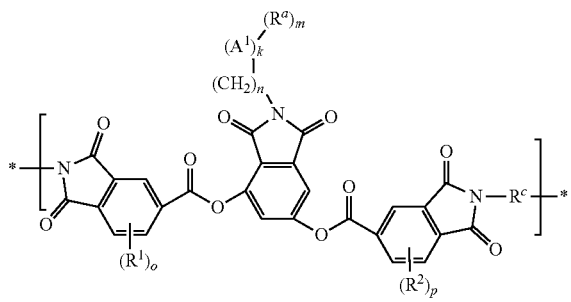

wherein, in Chemical Formulae 14 and 15, $R^a$, $A^1$, m, k, n, $R^1$, $R^2$, o, and p are the same as defined in Chemical Formula 1, and $R^c$ is the same as defined in Chemical Formula 5.

The diamine represented by Chemical Formula 5 may be represented by at least one of Chemical Formula 6 to Chemical Formula 9:

Chemical Formula 6

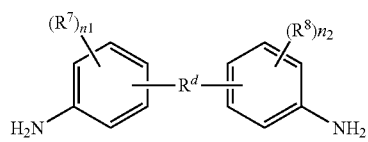

wherein, in Chemical Formula 6,
$R^d$ is selected from the following chemical formulae:

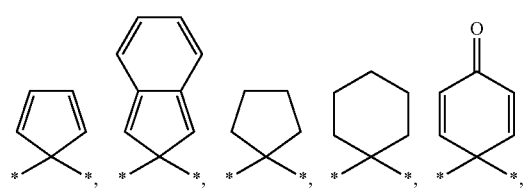

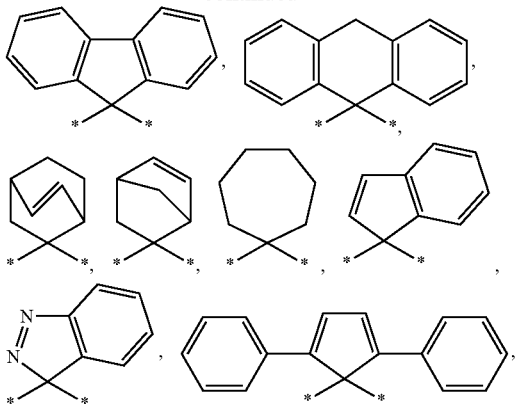

$R^7$ and $R^8$ are the same or different and are independently a halogen, a hydroxy group, an alkoxy group ($-OR^{200}$, wherein $R^{200}$ is a C1 to C10 aliphatic organic group), a silyl group ($-SiR^{201}R^{202}R^{203}$, wherein $R^{201}$, $R^{202}$, and $R^{203}$ are the same or different and are independently hydrogen or a C1 to C10 aliphatic organic group), a substituted or unsubstituted C1 to C10 aliphatic organic group, or a substituted or unsubstituted C6 to C20 aromatic organic group, and n1 and n2 are independently an integer ranging from 0 to 4;

Chemical Formula 7

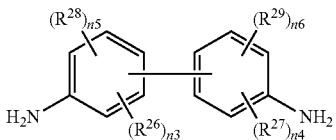

wherein, in Chemical Formula 7, $R^{26}$ and $R^{27}$ are the same or different and are independently an electron withdrawing group selected from $-CF_3$, $-CCl_3$, $-CBr_3$, $-Cl_3$, $-NO_2$, $-CN$, $-COCH_3$, or $-CO_2C_2H_5$, $R^{28}$ and $R^{29}$ are the same or different and are independently a halogen, a hydroxy group, an alkoxy group ($-OR^{204}$, wherein $R^{204}$ is a C1 to C10 aliphatic organic group), a silyl group ($-SiR^{205}R^{206}R^{207}$, wherein $R^{205}$, $R^{206}$, and $R^{207}$ are the same or different and are independently hydrogen or a C1 to C10 aliphatic organic group), a substituted or unsubstituted C1 to C10 aliphatic organic group, or a substituted or unsubstituted C6 to C20 aromatic organic group, n3 is an integer ranging from 1 to 4, and n5 is an integer ranging from 0 to 3, provided that n3+n5 is an integer ranging from 1 to 4, and n4 is an integer ranging from 1 to 4, and n6 is an integer ranging from 0 to 3, provided that n4+n6 is an integer ranging from 1 to 4;

Chemical Formula 8

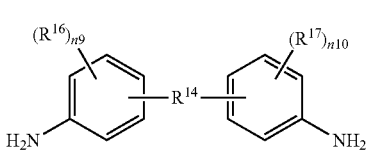

wherein, in Chemical Formula 8, $R^{14}$ includes O, S, C(=O), CH(OH), S(=O)$_2$, Si(CH$_3$)$_2$, (CH$_2$)$_p$ (wherein, $1 \le p \le 10$), (CF$_2$)$_q$ (wherein, $1 \le q \le 10$), C(CH$_3$)$_2$, C(CF$_3$)$_2$, C(=O)NH, or a substituted or unsubstituted C6 to C18 aromatic organic group, wherein the substituted or unsubstituted C6 to C18 aromatic organic group is present as a single aromatic ring, a fused ring including two or more aromatic rings, or a ring system including two or more of the single aromatic ring and/or the fused ring that are linked by a single bond or a functional group of a fluorenylene group, O, S, C(=O), CH(OH), S(=O)$_2$, Si(CH$_3$)$_2$, (CH$_2$)$_p$ (wherein, $1 \le p \le 10$), (CF$_2$)$_q$ (wherein, $1 \le q \le 10$), C(CH$_3$)$_2$, C(CF$_3$)$_2$, or C(=O)NH, $R^{16}$ and $R^{17}$ are the same or different and are independently a halogen, a hydroxy group, an alkoxy group (—OR$^{212}$, wherein R$^{212}$ is a C1 to C10 aliphatic organic group), a silyl group (—SiR$^{213}$R$^{214}$R$^{215}$, wherein R$^{213}$, R$^{214}$, and R$^{215}$ are the same or different and are independently hydrogen or a C1 to C10 aliphatic organic group), a substituted or unsubstituted C1 to C10 aliphatic organic group, or a substituted or unsubstituted C6 to C20 aromatic organic group, and n9 and n10 are independently an integer ranging from 0 to 4.

The diamine represented by Chemical Formula 5 may include at least one of the diamine represented by Chemical Formula 7 and the diamine represented by Chemical Formula 8, wherein the diamine represented by Chemical Formula 7 may include 2,2'-bis(trifluoromethyl)benzidine (TFDB), and the diamine represented by Chemical Formula 8 may include 4,4'-diaminodiphenyl sulfone (DADPS).

When the compound represented by Chemical Formula 1 reacts with TFDB, as a diamine, the first imide structural unit may include a structural unit represented by Chemical Formula 16:

Chemical Formula 16

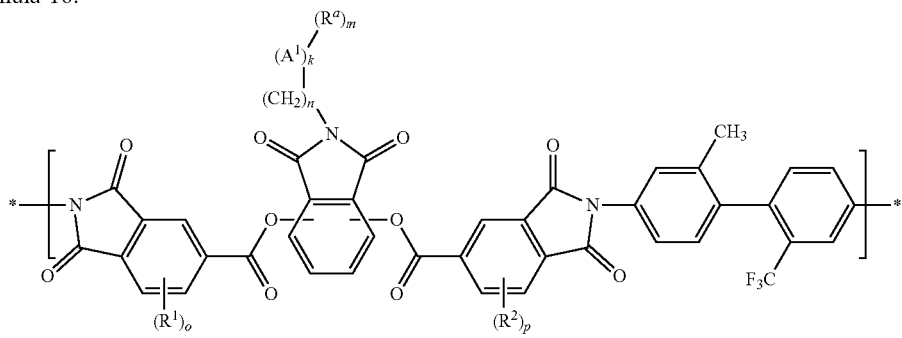

When the compound represented by Chemical Formula 1 reacts with DADPS, as a diamine, the first imide structural unit may include a structural unit represented by Chemical Formula 17:

Chemical Formula 17

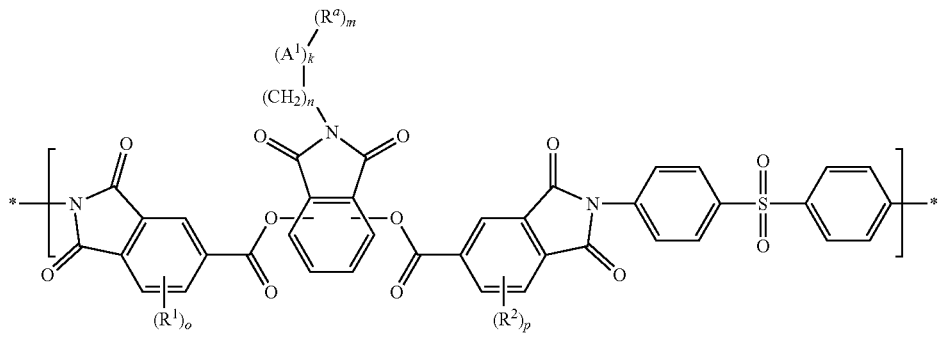

wherein, in Chemical Formulae 16 and 17, $R^a$, $A^1$, m, k, n, $R^1$, $R^2$, o, and p are the same as defined in Chemical Formula 1.

The polymer may be a reaction product of the reactants that further include a compound represented by Chemical Formula 9, as a dianhydride, in addition to the compound represented by Chemical Formula 1:

Chemical Formula 9

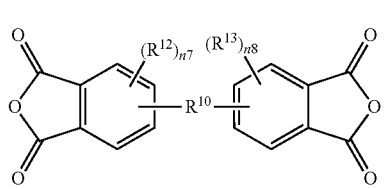

wherein in Chemical Formula 9, $R^{10}$ is a single bond, —O—, —S—, —C(=O)—, —CH(OH)—, —C(=O)NH—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, or —(CH$_2$)$_p$—C(C$_n$F$_{2n+1}$)$_2$—(CH$_2$)$_q$— (wherein $1 \leq n \leq 10$, $1 \leq p \leq 10$, and $1 \leq q \leq 10$), $R^{12}$ and $R^{13}$ are independently a halogen, a hydroxy group, a substituted or unsubstituted C1 to C10 aliphatic organic group, a substituted or unsubstituted C6 to C20 aromatic organic group, a —OR$^{201}$ group (wherein R$^{201}$ is a C1 to C10 aliphatic organic group), or a —SiR$^{210}$R$^{211}$R$^{212}$ group (wherein R$^{210}$, R$^{211}$, and R$^{212}$ are independently hydrogen or a C1 to C10 aliphatic organic group), and n7 and n8 are independently one of integers of 0 to 3;

The compound represented by Chemical Formula 9 may include a compound represented by Chemical Formula 10, a compound represented by Chemical Formula 11, or a combination thereof:

Chemical Formula 10

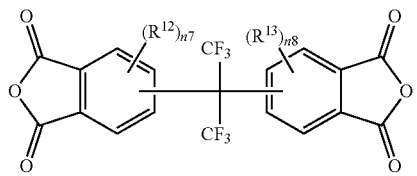

Chemical Formula 11

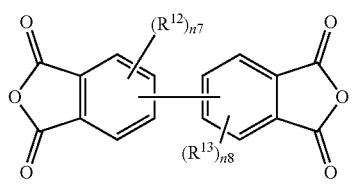

wherein, in Chemical Formula 10 and Chemical Formula 11, $R^{12}$ and $R^{13}$ are the same or different and are independently a halogen, a hydroxy group, an alkoxy group (—OR$^{208}$, wherein R$^{208}$ is a C1 to C10 aliphatic organic group), a silyl group (—SiR$^{209}$R$^{210}$R$^{211}$, wherein R$^{209}$, R$^{210}$, and R$^{211}$ are the same or different and are independently hydrogen or a C1 to C10 aliphatic organic group), a substituted or unsubstituted C1 to C10 aliphatic organic group, or a substituted or unsubstituted C6 to C20 aromatic organic group, and n7 and n8 are independently an integer ranging from 0 to 3.

When the reactants further includes the compound represented by Chemical Formula 9, the polymer prepared from the reactants, according to an embodiment, may further include a second imide structural unit represented by Chemical Formula 18:

Chemical Formula 18

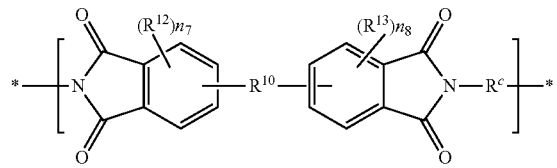

wherein, in Chemical Formula 18, $R^{10}$, $R^{12}$, $R^{13}$, n7, and n8 are the same as defined in Chemical Formula 9, and $R^c$ is the same as defined in Chemical Formula 5.

The second imide structural unit represented by Chemical Formula 18 may include a structural unit represented by Chemical Formula 19, a structural unit represented by Chemical Formula 20, or a combination thereof:

Chemical Formula 19

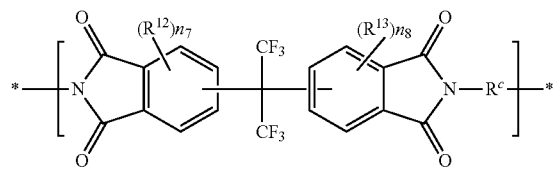

Chemical Formula 20

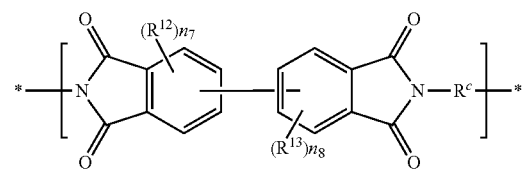

wherein, in Chemical Formulae 19 and 20, $R^{10}$, $R^{12}$, $R^{13}$, n7, and n8 are the same as defined in Chemical Formula 9, and $R^c$ is the same as defined in Chemical Formula 5.

The reactants may further include a dicarboxylic acid derivative represented by Chemical Formula 12:

Chemical Formula 12

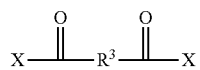

wherein, in Chemical Formula 12, $R^3$ is at least one of a substituted or unsubstituted phenylene group and a substituted or unsubstituted biphenylene group, and each X is the same or different and is a halogen atom.

In Chemical Formula 12, $R^3$ may be at least one of an unsubstituted phenylene group and an unsubstituted biphenylene group, and X may independently be Cl or Br.

When the reactants further includes the dicarboxylic acid derivative represented by Chemical Formula 12, the dicarboxylic acid derivative may react with the diamine represented by Chemical Formula 5 to form an amide structural unit represented by Chemical Formula 21:

Chemical Formula 21

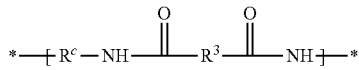

wherein, in Chemical Formula 21, $R^c$ is the same as defined in Chemical Formula 5, and $R^3$ is the same as defined in Chemical Formula 12.

In an exemplary embodiment, when the diamine represented by Chemical Formula 5 includes TFDB, and the dicarboxylic acid derivative represented by Chemical Formula 3 includes terephthaloyl chloride (TPCl), in which $R^3$ is phenylene group and X is Cl, the structural unit represented by Chemical Formula 21 may include a structural unit represented by Chemical Formula 22:

Chemical Formula 22

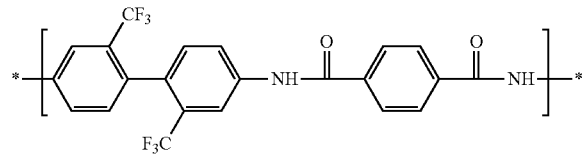

In an exemplary embodiment, when the diamine represented by Chemical Formula 5 includes DADPS, and the dicarboxylic acid derivative represented by Chemical Formula 3 includes terephthaloyl chloride (TPCl), in which $R^3$ is phenylene group and X is Cl, the structural unit represented by Chemical Formula 21 may include a structural unit represented by Chemical Formula 23:

Chemical Formula 23

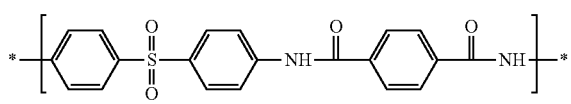

In an exemplary embodiment, the polymer may be a reaction product of the reactants that include a compound according to an embodiment, for example, a compound represented by Chemical Formula 3, a compound represented by Chemical Formula 4, or a combination thereof, and a dianhydride represented by Chemical Formula 9, for example, a dianhydride represented by Chemical Formula 10, a dianhydride represented by Chemical Formula 11, or a combination thereof in a mole ratio of about 99:1 to about 1:99, for example, about 90:10 to about 10:90, for example, about 85:15 to about 15:85, for example, about 80:20 to about 20:80, for example, about 75:25 to about 25:75, for example, about 70:30 to about 30:70, for example, about 65:35 to about 35:65, for example, about 60:40 to about 40:60, for example, about 55:45 to about 45:55, or for example, about 50:50.

Within the above range, a polyimide-based polymer having a desired optical properties and/or a high heat resistance may be prepared by appropriately adjusting the ratio of the compound, according to an embodiment, and a dianhydride represented by Chemical Formula 9.

The polymer may be, for example, formed as a film, and thus, used as a polymer film. The polymer film may be, for example, transparent, and thus, used for any application requiring transparency. The polymer film may be, for example, used for various uses such as a substrate, a protective film, a compensation film, an optical film, a dielectric layer, an insulation layer, an adhesive layer, and the like.

Hereinafter, a compensation film, according to an embodiment, is described.

A compensation film, according to an embodiment, includes the polymer.

That is, the compensation film, according to an embodiment, may include a polyimide-based polymer including an imide structural unit prepared by reacting the compound, according to an embodiment, that is, the compound represented by Chemical Formula 1 with diamine, for example, a first imide structural unit represented by at least one of Chemical Formulae 13 to 17.

Or, the compensation film, according to an embodiment, may include a polyimide-based polymer that further includes a second imide structural unit represented by at least one of Chemical Formulae 18 to 20, in addition to the first imide structural unit, when the reactants further include an additional dianhydride, that is, the dianhydride represented by Chemical Formula 9, in addition to the compound, according to an embodiment.

Further, the compensation film, according to an embodiment, may include a polyimide-based polymer including a first imide structural unit, and an amide structural unit represented by at least one of Chemical Formulae 21 to 23, if the reactants further includes dicarboxylic acid derivative represented by Chemical Formula 12.

In an exemplary embodiment, the compensation film may include a poly(amide-imide) copolymer, which includes a first imide structural unit represented by at least one of Chemical Formulae 13 to 17, a second imide structural unit represented by at least one of Chemical Formulae 18 to 20, and an amide structural unit represented by at least one of Chemical Formulae 21 to 23.

In addition, the polymer, according to an embodiment, may further include any structural unit that is a reaction product of reactants that include any additional dianhydrides, diamines, and/or dicarboxylic acid derivatives, in addition to the first imide structural unit. The additional dianhydrides, diamines, and/or dicarboxylic acid derivatives have no particular limit, but may be used along with any other kinds which may reinforce a function of an article manufactured from a polymer or a copolymer formed thereof, for example, an optical film, for example, a compensation film.

A film formed from the polymer, according to an embodiment, may have high thermal stability, for example, a high glass transition temperature of greater than or equal to about 150° C., for example, greater than or equal to about 160° C., for example, greater than or equal to about 170° C., for example, greater than or equal to about 180° C., for example, greater than or equal to about 190° C., for example, greater than or equal to about 200° C., for example, greater than or equal to about 210° C., for example, greater than or equal to about 220° C., for example, greater than or equal to about 230° C., for example, greater than or equal to about 240° C., and for example, greater than or equal to about 250° C.

In addition, the film formed from the polymer, according to an embodiment, may have excellent optical characteristic, for example, high light transmittance at about 450 nm, for example, transmittance of greater than or equal to about 85%, for example, greater than or equal to about 86%, for example, greater than or equal to about 87%, for example, greater than or equal to about 88%, for example, greater than or equal to about 89%, and for example, greater than or equal to about 90%.

In addition, the film formed from the polymer, according to an embodiment, may have a high out-of-plane birefringence of, for example, greater than or equal to about 0.03, for example, greater than or equal to about 0.04, for example, greater than or equal to about 0.05, for example, greater than or equal to about 0.06, for example, greater than or equal to about 0.07, for example, greater than or equal to about 0.08, and for example, greater than or equal to about 0.09 at a thin film thickness of less than or equal to about 100 micrometers (μm), for example, less than or equal to about 90 μm, for example, less than or equal to about 80 μm, for example, less than or equal to about 70 μm, for example, less than or equal to about 60 μm, for example, less than or equal to about 50 μm, for example, less than or equal to about 40 μm, for example, less than or equal to about 30 μm, for example, less than or equal to about 20 μm, for example, less than or equal to about 15 μm, for example, less than or equal to about 10 μm, and for example, less than or equal to about 5 μm.

In other words, the film formed from the polymer, according to an embodiment, shows high thermal stability, for example, a high glass transition temperature and excellent optical characteristics, for example, high light transmittance and high out-of-plane birefringence at 450 nm, particularly, a high out-of-plane birefringence at a thin film thickness of less than or equal to about 100 μm, and thus, may be used as an optical film such as a compensation film and the like.

When the film is used as a compensation film, the compensation film may have a predetermined retardation by changing light absorption characteristics depending on a refractive index and a wavelength.

A retardation (R) of the compensation film may be represented by an in-plane retardation ($R_o$) and a thickness direction retardation ($R_{th}$). The in-plane retardation ($R_o$) of compensation film is a retardation generated in in-plane of the compensation film and may be represented by $R_o=(n_x-n_y)d$. The thickness direction retardation ($R_{th}$) of the compensation film is a retardation generated in a thickness direction of the compensation film and may be represented by $R_{th}=\{[(n_x+n_y)/2]-n_z\}d$. Herein, $n_x$ is a refractive index in a direction having a highest in-plane refractive index in a plane of the compensation film (hereinafter, referred to as a 'slow axis'), $n_y$ is a refractive index in a direction having a lowest in-plane refractive index in a plane of the compensation film (hereinafter, referred to as a 'fast axis'), $n_z$ is a refractive index in a direction perpendicular to the slow axis and the fast axis of the compensation film, and d is a thickness of the compensation film.

The compensation film may have predetermined in-plane retardation and thickness direction retardation by changing the $n_x$, $n_y$, $n_z$, and/or thickness (d).

The retardation of the compensation film may be the same or different depending on a wavelength.

For example, the compensation film may have a forward wavelength dispersion retardation wherein a retardation about light at a short wavelength is larger than a retardation about light at a long wavelength. When a 550 nanometers (nm) wavelength is a reference wavelength, for example retardations (R) at 450 nm, 550 nm, and 650 nm wavelengths of the compensation film may satisfy Relationship Equation 1 or 2.

$$R(450 \text{ nm}) \geq R(550 \text{ nm}) \geq R(650 \text{ nm}) \quad \text{Relationship Equation 1}$$

$$R(450 \text{ nm}) > R(550 \text{ nm}) \geq R(650 \text{ nm}) \quad \text{Relationship Equation 2}$$

For example, the compensation film may have a flat wavelength dispersion retardation wherein a retardation about light at a long wavelength is substantially equivalent to a retardation about light at a short wavelength and retardations (R) at 450 nm, 550 nm, and 650 nm wavelengths of the compensation film may satisfy Relationship Equation 3.

$$R(450 \text{ nm}) = R(550 \text{ nm}) = R(650 \text{ nm}) \quad \text{Relationship Equation 3}$$

For example, the compensation film may have a reverse wavelength dispersion retardation wherein a retardation about light at a long wavelength is larger than a retardation about light at a short wavelength and for example retardations (R) at 450 nm, 550 nm, and 650 nm wavelengths of the compensation film may satisfy Relationship Equation 4 or 5.

$$R(450 \text{ nm}) \leq R(550 \text{ nm}) < R(650 \text{ nm}) \quad \text{Relationship Equation 4}$$

$$R(450 \text{ nm}) < R(550 \text{ nm}) \leq R(650 \text{ nm}) \quad \text{Relationship Equation 5}$$

In Relationship Equations 1 to 5,

R(450 nm) is an in-plane retardation or a thickness direction retardation of the compensation film at a 450 nm wavelength, R(550 nm) is an in-plane retardation or a thickness direction retardation of the compensation film at a 550 nm wavelength, and R(650 nm) is an in-plane retardation or a thickness direction retardation of the compensation film at a 650 nm wavelength.

The compensation film may be adjusted to have a desired retardation depending on a wavelength.

The compensation film may have high birefringence, and thus, a relatively thin thickness. The compensation film may have, for example, a thickness of about 3 micrometer (μm) to about 200 μm, within the range, a thickness of about 5 μm to about 150 μm, and within the range, a thickness of about 5 μm to about 100 μm.

The compensation film includes a substantially transparent polymer, and thus, may be used as a substrate, and accordingly, a separate substrate beneath the compensation film may be omitted. Accordingly, a thickness of the compensation film may be further reduced. Accordingly, the compensation film may be effectively applied to a flexible display device such as a foldable display device or a bendable display device, and thus, improve optical properties and display characteristics.

The compensation film may be formed, for example, through preparation of the monomer, according to an embodiment, polymerization of the monomer into a polymer, transformation of the polymer into a polymer film, and elongation of the polymer film.

The compensation film may be elongated, for example, at an elongation rate of about 110% to about 1,000% at about 50° C. to about 500° C. Herein, the elongation rate indicates a length ratio before and after the elongation, that is, an increased length degree of the compensation film after elongation in a uniaxial direction. For example, the compensation film may be elongated in a uniaxial direction.

The compensation film may be prepared by a method including, for example, preparing a monomer, according to an embodiment, preparing a polymer by polymerizing the monomer, solvating or dispersing the polymer in a solvent to prepare a polymer solution or dispersion, forming a thin film by coating the polymer solution or dispersion on a substrate, and heating the thin film.

The compensation film may be used alone or along with other compensation films.

The compensation film may be used with a polarizer and may be used as an optical film to prevent reflection of external light of a display device. The optical film may be for example an anti-reflective film, but is not limited thereto.

Figure 2:
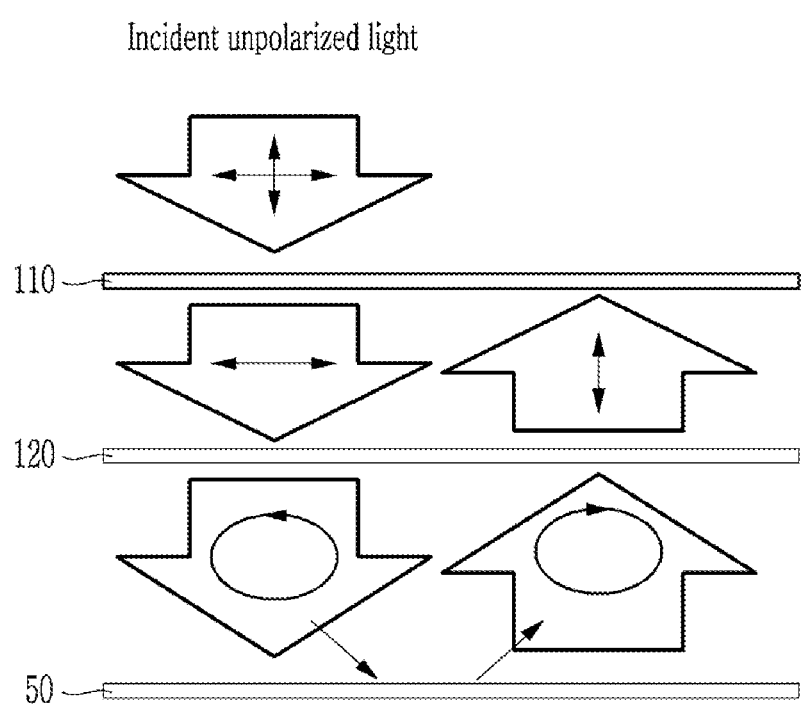
FIG. 2 is a schematic cross-sectional view showing the external light anti-reflection principle of an optical film.
Figure 3:
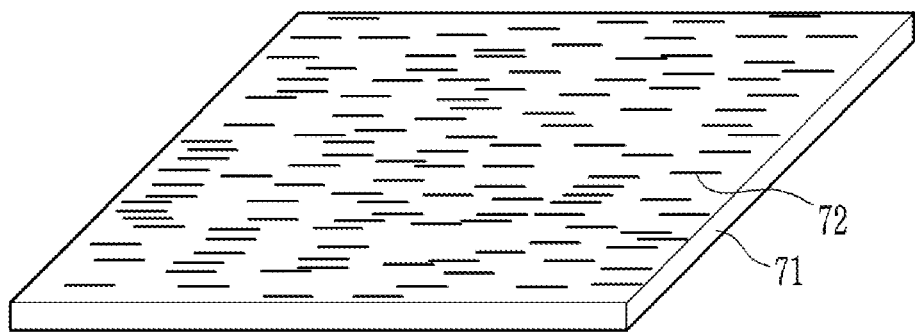
FIG. 3 is a schematic view showing an embodiment of a polarizing film.

FIG. 1 is a schematic cross-sectional view of an optical film, according to an embodiment, FIG. 2 is a schematic view showing the external light anti-reflection principle of an optical film, and FIG. 3 is a schematic view showing an embodiment of a polarizing film.

Referring to FIG. 1, an optical film 100, according to an embodiment, includes a polarizer 110 and a compensation film 120. The compensation film 120 may circularly polarize light passing the polarizer 110 to generate retardation and may have an effect on reflection and/or absorption of light.

For example, the optical film 100 may be formed on one surface or both surfaces of a display device and particularly on the screen side of the display device, and thus, may prevent reflection of light inflowing from the outside (hereinafter referred to as "external light"). Accordingly, visibility deterioration due to reflection of external light may be prevented.

FIG. 2 is a schematic view showing the external light anti-reflection principle of an optical film.

Referring to FIG. 2, while the incident unpolarized light having entered from the outside is passed through the polarizer 110, only a first polarized perpendicular component, which is one polarized perpendicular component of two polarized perpendicular components, is transmitted, and the polarized light is shifted into circularly polarized light by passing through the compensation film 120. While the circularly polarized light is reflected in a display panel 50 including a substrate, an electrode, and so on, and changes to the circular polarization direction, and the circularly polarized light is passed through the compensation film 120 again, only a second polarized perpendicular component, which is the other polarized perpendicular component of the two polarized perpendicular components, may be transmitted. As the second polarized perpendicular component is not passed through the polarizer 110, and light does not exit to the outside, effects of preventing the external light reflection may be provided.

The polarizer 110 may be for example a polarizing plate or a polarizing film.

The polarizer 110 may be, for example, a PVA polarizer that includes polyvinylalcohol.

Referring to FIG. 3, the polarizer 110 may be a polarizing film having an integral structure that is made of for example a melt blend of a polymer resin 71 and a dichroic dye 72.

The polymer resin 71 may be for example a hydrophobic polymer resin, for example polyolefin such as polyethylene (PE), polypropylene (PP) and a copolymer thereof; polyamide such as nylon and aromatic polyamide; polyester such as polyethylene terephthalate (PET), polyethyleneterephthalate glycole (PETG), and polyethylenenaphthalate (PEN); polyacrylate such as polymethyl(meth)acrylate; polystyrene such as polystyrene (PS) and an acrylonitrile-styrene copolymer; polycarbonate; a vinyl chloride-based resin; polyimide; a sulfone resin; polyethersulfone; polyether-etherketone; polyphenylene sulfide; a polyvinyl alcohol resin; a vinylidene chloride resin; a polyvinyl butyral resin; an allylate resin; polyoxymethylene; epoxy resin, a copolymer thereof, or a combination thereof.

Among them, the polymer resin 71 may be for example a polyolefin resin, a polyamide resin, a polyester resin, a polyacrylic resin, a polystyrene resin, a copolymer thereof, or a combination thereof, for example polyethylene (PE), polypropylene (PP), polyethylene terephthalate (PET), polyethylene terephthalate glycole (PETG), polyethylene naphthalate (PEN), nylon, a copolymer thereof, or a combination thereof.

Among them, the polymer resin 71 may be polyolefin. The polyolefin may be for example a mixture of at least two selected from polyethylene (PE), polypropylene (PP), a copolymer of polyethylene and polypropylene (PE-PP), and may be for example a mixture of polypropylene (PP) and a polyethylene-polypropylene copolymer (PE-PP).

The polymer resin 71 may have transmittance of greater than or equal to about 85% in a wavelength region of about 400 nm to 780 nm. The polymer resin 71 may be elongated in a uniaxial direction. The uniaxial direction may be the same as a length direction of the dichroic dye 72 that will be described later.

The dichroic dye 72 is dispersed in the polymer resin 71 and aligned in one direction along the elongation direction of the polymer resin 71. The dichroic dye 72 transmits one perpendicular polarization component out of two perpendicular polarization components in a predetermined wavelength region.

The dichroic dye 72 may be included in an amount of about 0.01 to about 5 parts by weight based on 100 parts by weight of the polymer resin 71. Within the range, sufficient polarization characteristics may be obtained without deteriorating transmittance of a polarization film. Within the above range, the dichroic dye 72 may be included in an amount of about 0.05 to about 1 part by weight based on 100 parts by weight of the polymer resin 71.

The polarizer 110 may have a relatively thin thickness of less than or equal to about 100 μm, for example, about 30 μm to about 95 μm. When the polarizing film 70 has a thickness within the range, the polarizer 110 is relatively thinner than a polyvinyl alcohol polarizing plate requiring a protective layer such as triacetyl cellulose (TAC), and thus, may realize a thin display device.

The compensation film 120 is the same as described above.

The optical film 100 may further include a correction layer (not shown) disposed on one surface of the compensation film 120. The correction layer may be for example a color shift resistant layer, but is not limited thereto.

The optical film 100 may further include a light blocking layer (not shown) extended along the edge. The light blocking layer may be extended along the circumference of the optical film 100 and may be for example disposed between the polarizer 110 and the compensation film 120. The light blocking layer may include an opaque material, for example, a black material. For example, the light blocking layer may be made of a black ink.

The optical film 100 may be applied to various display devices.

A display device, according to an embodiment, includes a display panel and an optical film disposed on one surface of the display panel. The display panel may be a liquid crystal panel or an organic light emitting panel, but is not limited thereto.

Hereinafter, for one example of the display device, an organic light emitting diode (OLED) display is described.

Figure 4:
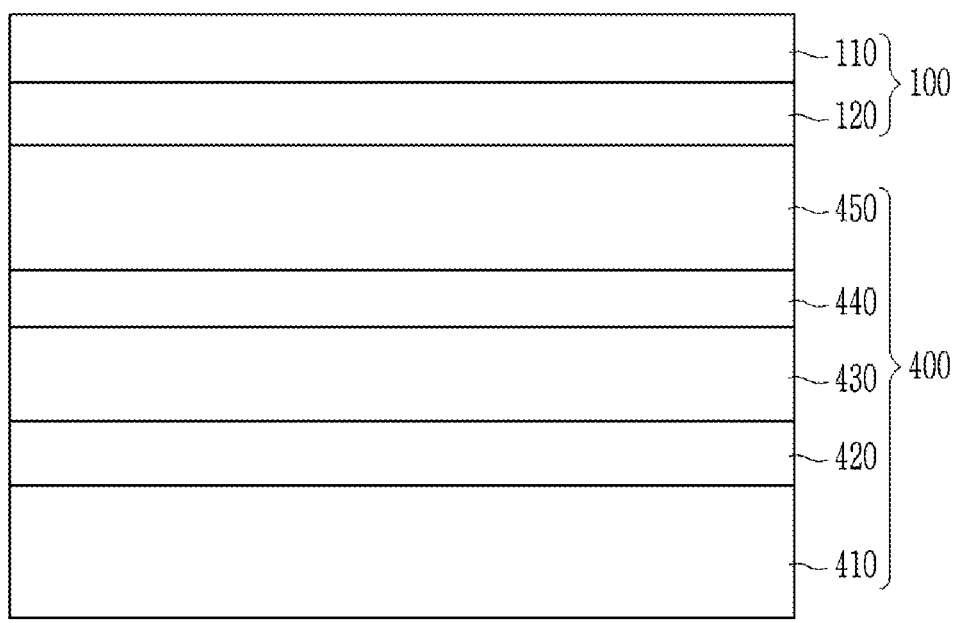
FIG. 4 is a schematic cross-sectional view of an organic light emitting diode (OLED) display, according to an embodiment.

FIG. 4 is a schematic cross-sectional view of an organic light emitting diode (OLED) display, according to an embodiment.

Referring to FIG. 4, an organic light emitting diode (OLED) display, according to an embodiment, includes an organic light emitting panel 400 and an optical film 100 disposed on one surface of the organic light emitting panel 400.

The organic light emitting panel 400 may include a base substrate 410, a lower electrode 420, an organic emission layer 430, an upper electrode 440, and an encapsulation substrate 450.

The base substrate 410 may be made of glass or a plastic.

One of the lower electrode 420 and the upper electrode 440 may be an anode and the other may be a cathode. The anode may be an electrode into which holes are injected and may be made of a transparent conductive material having a high work function and passing the emitted light externally, for example ITO or IZO. The cathode is an electrode into which electrons are injected and may be made of a conducting material having a low work function and having no effect on an organic material, for example aluminum (Al), calcium (Ca), and barium (Ba).

The organic emission layer 430 includes an organic material which may emit light when applying a voltage to the lower electrode 420 and the upper electrode 440.

An auxiliary layer (not shown) may be further provided between the lower electrode 420 and the organic emission layer 430 and between the upper electrode 440 and the organic emission layer 430. The auxiliary layer may include a hole transporting layer, a hole injecting layer, an electron injecting layer, and an electron transporting layer in order to balance electrons and holes.

The encapsulation substrate 450 may be made of glass, a metal, or a polymer, and may seal the lower electrode 420, the organic emission layer 430, and the upper electrode 440 to prevent moisture and/or oxygen inflow from the outside.

The optical film 100 may be disposed at a light emitting side. For example, in the case of a bottom emission structure emitting light at the side of the base substrate 410, the optical film 100 may be disposed on the exterior side of the base substrate 710, while on the other hand, in the case of a top emission structure emitting light at the side of the encapsulation substrate 450, the optical film 100 may be disposed on the exterior side of the encapsulation substrate 450.

The optical film 100 may include the integral structured polarizer 110 and the integrally structured compensation film 120. The polarizer 110 and the compensation film 120 are the same as described above and may prevent light passing the polarizer 110 from being reflected by a metal such as an electrode of the organic light emitting panel 400 and emitting outside of the organic light emitting device, and thus, prevents visibility from being deteriorated by externally inflow light. Therefore, display characteristics of the organic light emitting diode (OLED) display may be improved.

Hereinafter, for one example of the display device, a liquid crystal display (LCD) is described.

Figure 5:
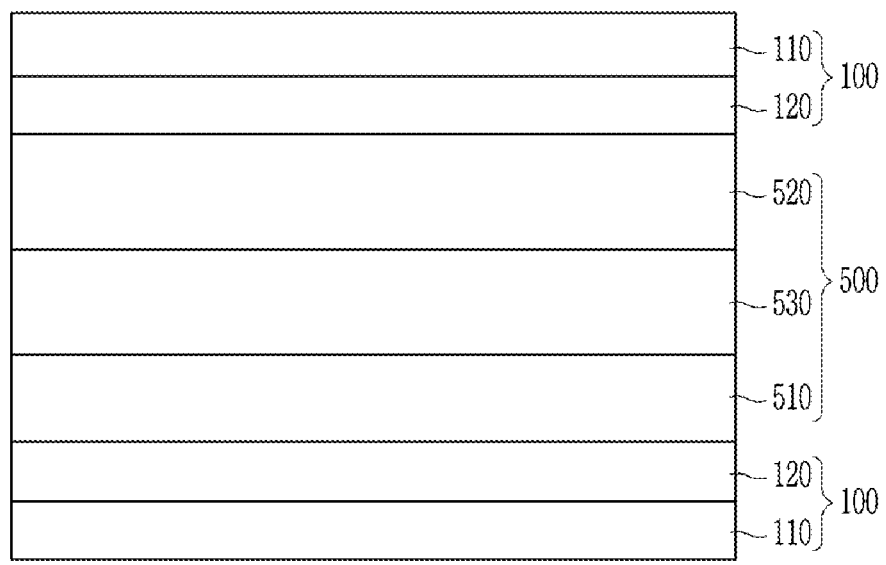
FIG. 5 is a schematic cross-sectional view of a liquid crystal display (LCD), according to an embodiment.

FIG. 5 is a schematic cross-sectional view of a liquid crystal display (LCD), according to an embodiment.

Referring to FIG. 5, a liquid crystal display (LCD), according to an embodiment, includes a liquid crystal panel 500 and an optical film 100 positioned on one surface or both surfaces of the liquid crystal panel 500.

The liquid crystal panel 500 may be a twist nematic (TN) mode panel, a vertical alignment (PVA) mode panel, an in-plane switching (IPS) mode panel, an optically compensated bend (OCB) mode panel, or the like.

The liquid crystal panel 500 may include a first display panel 510, a second display panel 520, and a liquid crystal layer 530 interposed between the first display panel 510 and the second display panel 520.

The first display panel 510 may include, for example, a thin film transistor (not shown) formed on a substrate (not shown) and a first electric field generating electrode (not shown) connected to the same, and the second display panel 520 may include, for example, a color filter (not shown) formed on a substrate (not shown) and a second electric field generating electrode (not shown). However, it is not limited thereto, and the color filter may be included in the first display panel 510, while the first electric field generating electrode and the second electric field generating electrode may be disposed on the first display panel 510 together.

The liquid crystal layer 530 may include a plurality of liquid crystal molecules. The liquid crystal molecules may have positive or negative dielectric anisotropy. In the case of the liquid crystal molecules having positive dielectric anisotropy, the major axes thereof may be aligned substantially parallel to the surface of the first display panel 510 and the second display panel 520 when not applying an electric field, and the major axes may be aligned substantially perpendicular to the surface of the first display panel 510 and second display panel 520 when applying an electric field. On the contrary, in the case of the liquid crystal molecules having negative dielectric anisotropy, the major axes may be aligned substantially perpendicular to the surface of the first display panel 510 and the second display panel 520 when not applying an electric field, and the major axes may be aligned substantially parallel to the surface of the first display panel 510 and the second display panel 520 when applying an electric field.

The optical film 100 may be disposed on the outside of the liquid crystal panel 500. Although the optical film 100 is shown to be provided on both the lower part and the upper part of the liquid crystal panel 500 in the drawing, it is not limited thereto, and it may be formed on only one of the lower part and the upper part of the liquid crystal panel 500.

Hereinafter, the present disclosure is illustrated in more detail with reference to examples. However, these examples are exemplary, and the present disclosure is not limited thereto.

EXAMPLES

Example 1: Synthesis of Compound P-1

Step 1: 3,6-Diacetoxy-N-benzylphthalimide (I-1)

3,6-Dihydroxyphthalic acid (molecular weight (mw)=198.13 grams per mole (g/mol), 75.7 millimoles (mmol), mass (m)=15 grams, gr) was suspended in thionyl chloride (mw=118.97 g/mol, density (d)=1.64 grams per cubic centimeter (gr/cm$^3$), 0.76 moles (mol), m=90.4 gr, volume (V)=55 milliliters, mL), and the mixture was stirred and refluxed for 8 hours. Excess of thionyl chloride was evaporated under reduced pressure, and the residual solvent was removed by addition of 100 mL of toluene and subsequent evaporation of solvent. The resulted solid was dissolved in 100 mL of dimethylacetamide, and benzylamine (mw=107.16 g/mol, 75.7 mmol, m=8.11 gr) was added thereto and the mixture was stirred at 100° C. for 30 min. Then, acetic anhydride (mw=102.1 g/mol, 0.75 mol, m=76.6 gr) and pyridine (mw=79.1 g/mol, 0.75 mol, m=59.3 gr) were added, and the mixture was stirred for 30 min at 120° C. After cooling the resultant to room temperature, the solution was diluted with 1 liter (L) of water to precipitate. The precipitated solid was filtered and crystallized twice from methanol with addition of dichloromethane. Product I-1 (3,6-Diacetoxy-N-benzylphthalimide) is obtained, as an intermediate, as white solid (m=16 gr (mw=353.33 g/mol, 45.4 mol)).

$R_f$=0.48 (eluent: ethylacetate:hexane=1:2, TLC silica gel 60 $F_{254}$);

mp=146-147° C., yield 60%;

$^1$H NMR (DMSO-$d_6$) 300 MHz, δ, ppm: 2.36; (s, 6H), 4.68; (s, 2H), 7.25-7.38; (m, 5H), 7.66; (s, 2H).

Step 2: 3,6-Dihydroxy-N-benzylphthalimide (I-2)

Product I-1 (3,6-Diacetoxy-N-benzylphthalimide) (mw=353.33 g/mol, 22.1 mmol, m=7.8 gr), prepared in step 1, was dissolved in 0.4 L of 1:1 mixture of methanol and chloroform. Para-toluenesulfonic acid monohydrate (mw=190.22 g/mol, 66.3 mmol, m=12.6 gr) was added to the solution. The mixture was stirred at 60° C. for 12 hours. Solvent was evaporated under reduced pressure and the residue was treated with 0.5 L of water. Yellowish solid was filtered, thoroughly washed with water, and dried at 100° C. for 12 hours. Product I-2 (3,6-Dihydroxy-N-benzylphthalimide), as an intermediate, is obtained as yellowish crystalline solid (m=5.8 gr (mw=269.26 g/mol, 21.5 mol)).

$R_f$=0.31 (eluent: ethylacetate:hexane=1:2, TLC silica gel 60 $F_{254}$), mp=202.1° C., yield 97.3%;

$^1$H NMR (DMSO-$d_6$) 300 MHz, δ, ppm: 4.65; (s, 2H), 7.08; (s, 2H), 7.24-7.35; (m, 5H), 10.25; (s, 2H, OH).

Step 3: 3,6-Dihydroxyphthalimide bis(trimellitic ester) dianhydrides (P-1)

Product 1-2 (3,6-Dihydroxy-N-benzylphthalimide) (mw=269.26 g/mol, 21.2 mol, m=5.7 gr), prepared in step 2, was dissolved in the mixture of triethylamine (mw=101.19 g/mol, 46.6 mol, m=4.7 gr) and 30 mL of acetonitrile. The resulting solution was added dropwise to the stirred solution of trimellitic anhydride chloride (mw=210.57 g/mol, 46.6 mol, m=9.8 gr) in 0.3 L of acetonitrile at 100° C. (oil bath) within 10 min. The resulting mixture was refluxed for 4 hours, and filtered hot to remove insoluble matters. White crystalline material precipitated after the solution was cooled to room temperature. It was filtered and washed with small portions of acetonitrile. The resulting white solid was recrystallized 2 times from 0.3 L of acetonitrile with addition of acetic anhydride (mw=102.09 g/mol, 0.15 mol, m=15.3 gr). During the second crystallization the solution of monomer was refluxed for 3 hours.

Solid after crystallization was washed with small portions of acetonitrile and dried at 90° C. for 12 h in the convection oven. Product is white crystalline solid (m=10 gr (mw=617.49 g/mol, 16.2 mmol)), yield 76.4%.

Figure 6:
FIG. 6 is a $^1$H NMR graph of intensity (arbitrary units) versus chemical shift (parts per million, ppm) of Compound P-1 according to Example 1.
Figure 6:
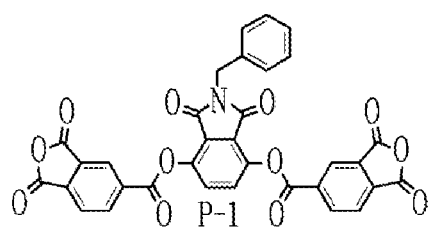
Figure 6:
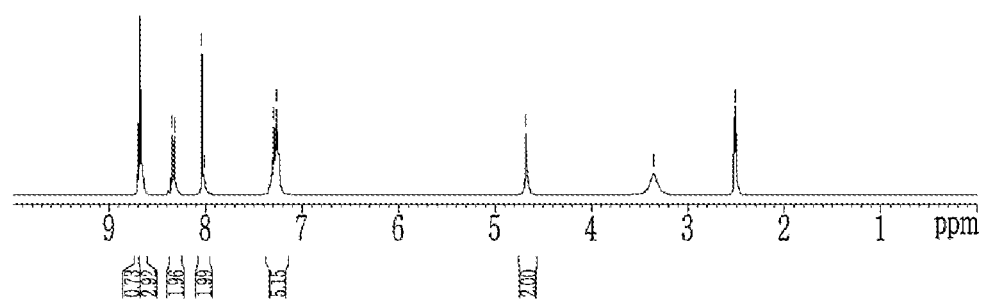
Figure 7:
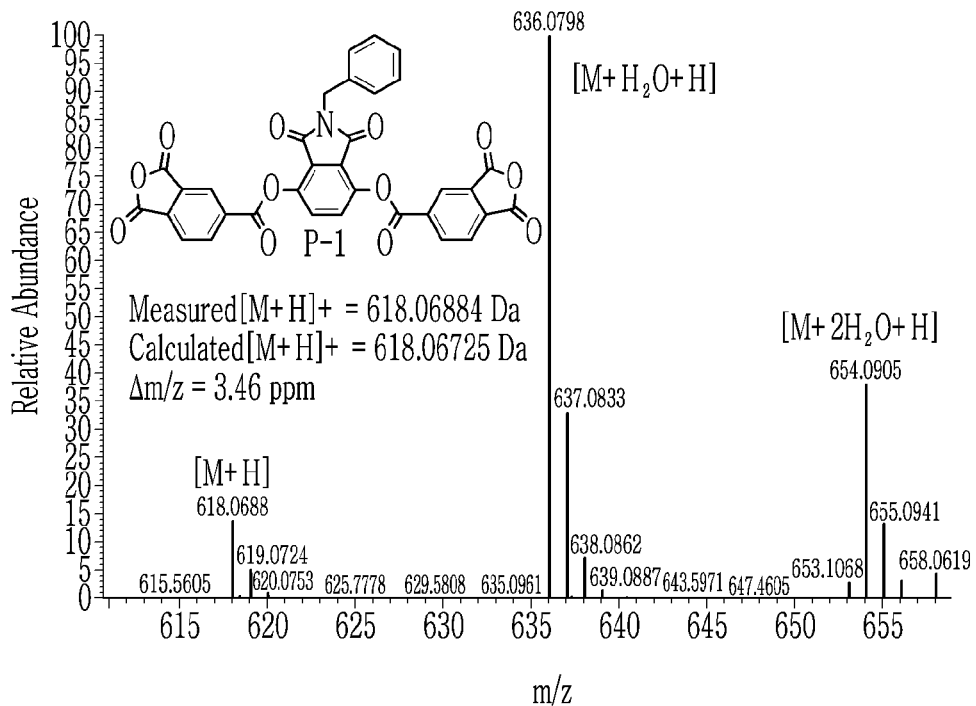
FIG. 7 is a graph of relative abundance (arbitrary units) versus (parts per million, ppm) showing a HRMS APCI mode (High resolution mass spectrometry/Atmospheric-pressure chemical ionization mode) of Compound P-1 according to Example 1.
Figure 8:
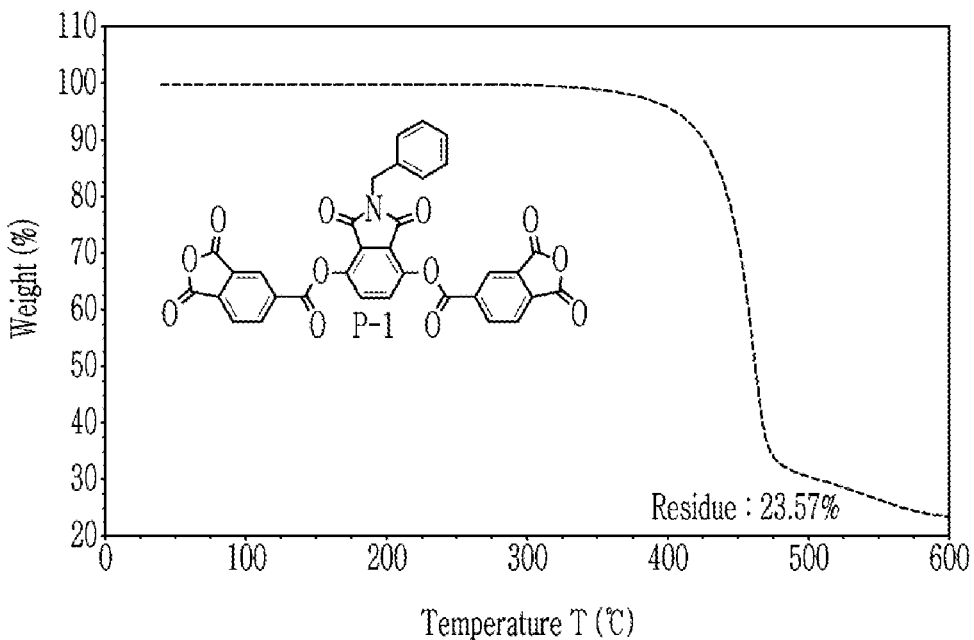
FIG. 8 is a thermogravimetric analysis (TGA) graph of weight (percent, %) versus temperature (degree Centigrade, ° C.) showing a thermal decomposition depending on a temperature from Compound P-1 according to Example 1.
Figure 9:
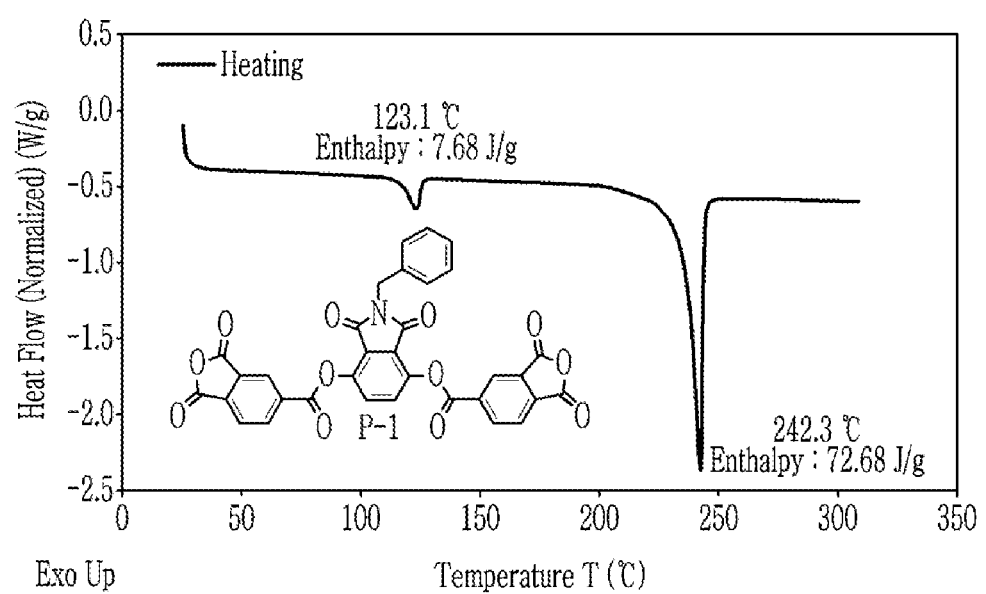
FIG. 9 is a differential scanning calorimetry (DSC) graph of normalized heat flow (watts per gram, W/g) versus temperature (degree Centigrade, ° C.) of Compound P-1 according to Example 1.

$^1$H NMR (DMSO-$d_6$) 300 MHz, δ, ppm: 4.67; (s, 2H), 7.23-7.33; (m, 5H), 8.04; (s, 2H), 8.34; (dd, 2H, $J^{12}$=7.8 Hz, $J^{13}$=0.3 Hz), 8.68; (d, 2H, $J^{13}$=0.3 Hz), 8.70; (dd, 2H, $J^{12}$=7.8 Hz, $J^{13}$=0.3 Hz) (see FIG. 6);

HRMS APCI (m/z) for $C_{33}H_{15}NO_{12}$: 618.06884 (measured mass), 618.06725 (calculated mass) for $[M+H]^+$ (See FIG. 7);

Thermal analysis: TGA (heating 10 degrees Centigrade per minute (° C./min), $N_2$ atmosphere): 1 percent by weight loss (353° C.) (See FIG. 8);

DSC (heating 10° C./min, $N_2$ atmosphere): mp=242.3° C. (See FIG. 9).

Examples 2 to 6: Synthesis of Polyester-imide and Manufacture of Films

Polyester-amic acid is prepared from the reactants that include Compound P-1 alone (Example 5), prepared in Example 1, or in combination of 6FDA, an additional dianhydride in a ratio described in Table 1 below, and a diamine, which is TFDB, or a mixture of TFDB and DADPS.

Particularly, each 1 equivalent of the diamine, which is TFDB, or a mixture of TFDB and DADPS, is dissolved in dry DMAc (dimethylacetamide), and each 1 equivalent of the dianhydride, which is Compound P-1 or a mixture of Compound P-1 and 6FDA, is added to the solution to prepare a mixture. Each mixture is stirred at 25° C. for 24 hours to react to produce polyester-amic acid solutions according to Examples 2 to 6. 3 equivalents of acetic anhydride and 3 equivalent of pyridine is added to each polyester-amic acid solution, stirred at 25° C. for 12 hours to prepare partially imidized polyester-(imide-amic acid) solutions.

The prepared polyester-(imide-amic acid) solutions are spin-coated on a glass substrate (50 mm×50 mm, mm=millimeters) at a rate of 1,000 revolutions per minute (rpm) to 3,000 rpm. The coated films are dried on a hot plate set at 80° C. for 30 minutes, heated from about 25° C. to about 230° C. at a heating rate of 10° C. per minute in a furnace, and allowed at 230° C. for 30 minutes to form the films.

Comparative Examples 1 to 3: Synthesis of Polyimide or Polyester-Imide and Manufacture of Films The same method as in Examples 2 to 6 is used to prepare a film according to Comparative Example 1, except that the reactants include TFDB alone, as a diamine, and 6FDA alone, as a dianhydride, and the diamine and dianhydride are reacted in a mole ratio of 1:1 to prepare a polyimide film.

Further, the same method as in Examples 2 to 6 is used to prepare a film according to Comparative Example 2, except that the reactants include TFDB alone, as a diamine, and a mixture of 6FDA and TAHQ (hydroquinone bis(trimellitate dianhydride) in a ratio described in Table 1 below, the latter of which is a known compound and represented as below, as a dianhydride in a ratio described in Table 1 below, and the diamine and dianhydride are reacted in a mole ratio of 1:1 to prepare a polyester-imide film.

In addition, the same method as in Examples 2 to 6 is used to prepare a film according to Comparative Example 3, except that the reactants include TFDB alone, as a diamine, and a mixture of 6FDA and Compound M-1 in a ratio described in Table 1 below, the latter of which is disclosed in U.S. patent application Ser. No. 16/048,700, the content of which is incorporated herein in its entirety by reference, and represented as below, as a dianhydride, and the diamine and dianhydride are reacted in a mole ratio of 1:1 to prepare a polyester-imide film.

Compound TAHQ

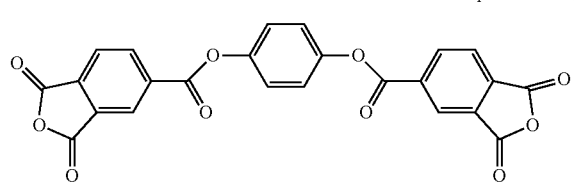

-continued

Compound M-1

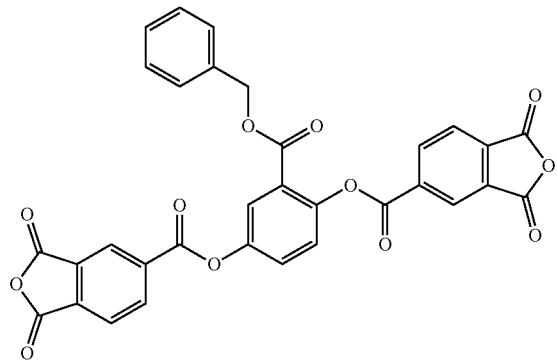

Evaluations

As for the films, compositions, inherent viscosity (η), thicknesses, light transmittance (%), yellowness index (YI), haze, out-of-plane birefringences ($\Delta n_{th}$), glass transition temperature ($T_g$), and 1 percent by weight degradation temperature of the films are measured and described in Table 1 below. The thickness, out-of-plane birefringences ($\Delta n_{th}$), light transmittance (%), haze, yellowness index (YI), and glass transition temperature ($T_g$) are measured as below:

(1) Film Thickness: measured by using Filmetrics F20 (Filmetrics, Inc., Kanagawa, Japan)

(2) Out-of-plane Birefringence ($\Delta n_{th}$): measured at a wavelength of 450 nm by using a prism coupler (Metricon MODEL 2010/M)

(3) Optical Characteristics (Transmittance, haze and Yellow Index): measured by using a spectrophotometer, "Konica Minolta CM3600d" in a transmittance opacity/haze mode.

(4) Inherent viscosity (η) is measured for 0.5 grams per deciliter (g/dL) of polymer in DMAc by using Cannon PolyVisc Automated Viscosimeter.

(5) Glass transition temperature ($T_g$) is measured by using thermal mechanical analyzer (TMA Q400, TA Instruments) at a fixed tension force of 0.05 normal (N), and in a temperature range of 50° C. to 400° C. at a heating rate of 5° C. per minute.

the polyester-imide film formed by using the novel compound according to an embodiment displays excellent optical characteristics. Further, the films have a high glass transition temperature of greater than or equal to 200° C., and the $T_d^{1\%}$, at which 1 weight % of film is degraded, is greater than or equal to 400° C., which shows sufficient thermal stability.

Meanwhile, as shown from Table 1, as the amount of Compound P-1 increases, the optical properties, such as, transmittance at 450 nm, YI, and haze, gradually deteriorate. However, while the deterioration is not significant, the out-of-plane birefringence drastically increases as the amount of Compound P-1 increases, and thus, the film prepared by using Compound P-1 alone, as a dianhydride, without 6FDA, has two times higher out-of-plane birefringence than the film prepared in Example 2, in which Compound P-1 is used in an amount of ¼ of 6-FDA. That is, it is confirmed that Compound P-1 has attributed to the increase of out-of-plane birefringence of a film due to its planarity and the two substituents attached to the core having a big steric hindrance.

The film according to Comparative Example 1 is prepared from the aromatic dianhydride, 6-FDA, and the aromatic diamine, TFDB, in a mole ratio of 1:1, both of which have been known to have high thermal stability and excellent optical properties. The film also exhibits excellent optical properties and high thermal stability, while showing a lower out-of-plane birefringence than the films according to Examples 2 to 6, all of which include Compound P-1 as a dianhydride.

The film according to Comparative Example 2 is prepared from a dianhydride mixture including 6-FDA and TAHQ, which is a known dianhydride having an ester bond, in a mole ratio of 8:2, and TFDB as a diamine. The film shows the highest out-of-plane birefringence of 0.1304 among all the Examples and Comparative Examples. However, the film according to Comparative Example 2 exhibits a light transmittance at 450 nm of 87.5% and YI of greater than 1, and thus, shows deteriorated optical properties than the films according to Examples 2 to 6. Further, while not showing in Table 1, the solid content in the solution containing the polymer was 9 weight % in the process of preparing the polymer, which was the lowest among all the Examples and Comparative Examples. This is because, as shown in the above Chemical Formula, the dianhydride compound,

TABLE 1

| Example | Composition | Ratio, mol part | $\eta_{inh}$, dL/g | thickness, μm | $T_{450}$, % | Y.I., % | Haze, % | $\Delta n_{th}$ | $T_g$, ° C. | $T_d^{1\%}$ ° C. |
|---|---|---|---|---|---|---|---|---|---|---|
| Example 2 | P-1:6-FDA/TFDB | 2:8/10 | 0.63 | 6.9 | 90.3 | 0.43 | 0.14 | 0.05193 | 293 | 461 |
| Example 3 | P-1:6-FDA/TFDB | 5:5/10 | 0.71 | 4.8 | 89.9 | 0.50 | 0.17 | 0.06866 | 259 | 447 |
| Example 4 | P-1:6-FDA/TFDB | 8:2/10 | 0.69 | 6.3 | 89.3 | 0.72 | 0.29 | 0.08936 | 227 | 420 |
| Example 5 | P-1/TFDB | 1/1 | 0.91 | 4.9 | 88.9 | 1.05 | 0.50 | 0.1073 | 201 | 411 |
| Example 6 | P-1:6-FDA/ TFDB:DADPS | 8:2/2:8 | 0.54 | 6.5 | 89.3 | 0.57 | 0.14 | 0.07445 | 245 | 425 |
| Comparative Example 1 | 6-FDA/TFDB | 1/1 | 0.73 | 5.0 | 90.6 | 0.31 | 0.21 | 0.0429 | 320 | 495 |
| Comparative Example 2 | TAHQ:6-FDA/ TFDB | 8:2/10 | 1.07 | 5.6 | 87.5 | 1.71 | 0.44 | 0.1304 | 244 | 456 |
| Comparative Example 3 | M-1:6-FDA/ TFDB | 8:2/10 | 0.88 | 6.1 | 89.5 | 0.54 | 0.24 | 0.0781 | 221 | 372 |

As shown in Table 1, the polyester-imide film formed by using novel Compound P-1 as a dianhydride shows high transmittance of greater than or equal to 88% at 450 nm, but low YI and haze, and a very high out-of-plane birefringence ($\Delta n_{th}$) of at least 0.05193 to at most about 0.10738. That is, TAHQ, has no substituent attached to the core, and thus, the polymer may have a very high packing density, which is not good for the solution process. Further, due to the high packing density among polymer chains, the film according to Comparative Example 2 may have deteriorated optical properties than the films according to Examples 2 to 6.

The film according to Comparative Example 3 is prepared from a dianhydride mixture including 6-FDA and Compound M-1 in a ratio of 8:2, the latter of which is disclosed in U.S. patent application Ser. No. 16/048,700, the content of which is incorporated herein in its entirety by reference, and TFDB as a diamine. Comparative Example 3 is different from Example 4 in that it is prepared from the dianhydride mixture including Compound M-1, instead of Compound P-1, according to an embodiment. Comparing the films according to Example 4 and Comparative Example 3, while the film according to Comparative Example 3 has equivalent or slightly superior transmittance at 450 nm, YI, and haze, the film according to Example 4 has a higher out-of-plane birefringence than that of Comparative Example 3.

That is, the polyester-imide film prepared from a novel aromatic ester bond containing dianhydride and an aromatic diamine has equivalent or a superior optical properties than the polyimide film according to Comparative Example 1, prepared from a specific aromatic dianhydride and an aromatic diamine, both of which have been known as having high thermal stability and excellent optical properties, as well as the polyester-imide film maintains sufficient thermal stability and shows a greatly high out-of-plane birefringence. Accordingly, the polyester-imide film can be advantageously used in preparing a compensation film that requires excellent optical properties, high thermal stability, as well as high out-of-plane birefringence.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A compound represented by Chemical Formula 1:

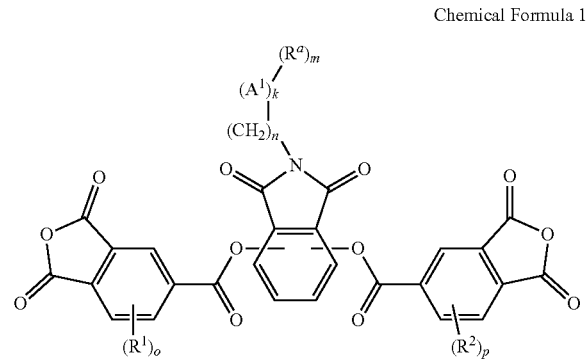

Chemical Formula 1 wherein, in Chemical Formula 1,
$R^1$ and $R^2$ are independently a substituted or unsubstituted C1 to C30 alkyl group, a substituted or unsubstituted C1 to C30 alkoxy group, a substituted or unsubstituted C3 to C30 cycloalkyl group, a substituted or unsubstituted C6 to C30 aryl group, a substituted or unsubstituted C1 to C30 acyl group, a hydroxy group, a halogen, a nitro group, —NR'R", —SiR'R"R'" (wherein R', R", and R'" are independently hydrogen, a C1 to C30 alkyl group, or a C6 to C30 aryl group), or a combination thereof, o and p are independently an integer ranging from 0 to 3,
$A^1$ is a C6 to C30 aromatic ring,
$R^a$ is hydrogen, a substituted or unsubstituted C1 to C30 alkyl group, a substituted or unsubstituted C1 to C30 alkoxy group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C2 to C30 heteroaryl group, a hydroxy group, a halogen, a nitro group, —NR'R", —C(=O)—NR'R", —SiR'R"R'" (wherein R', R", and R'" are independently hydrogen, a C1 to C30 alkyl group, a C6 to C30 aryl group, or a C7 to C30 arylalkyl group), or a group represented by Chemical Formula 2:

Chemical Formula 2 wherein, in Chemical Formula 2,
$L^2$ and $L^3$ are independently O, C(=O), C(=O)O, C≡C, or C(=O)$NR^b$ (wherein, $R^b$ is hydrogen or a C1 to C30 alkyl group),
$A^2$ and $A^3$ are independently a substituted or unsubstituted C6 to C30 aromatic ring, a substituted or unsubstituted fluorene ring, or a substituted or unsubstituted C7 to C30 arylalkyl group,
q and r are independently an integer ranging from 0 to 3, provided that q+r is an integer greater than or equal to 1,
m is an integer greater than or equal to 1, and
k and n are independently an integer greater than or equal to 0.

2. The compound according to claim 1, wherein in Chemical Formula 1,
o and p are independently 0 or 1,
$A^1$ is a C6 to C20 aromatic ring,
$R^a$ is hydrogen, a substituted or unsubstituted C1 to C20 alkyl group, a substituted or unsubstituted C1 to C20 alkoxy group, a substituted or unsubstituted C7 to C20 arylalkyl group, a substituted or unsubstituted C2 to C20 heteroaryl group, a halogen, —NR'R" (wherein R', and R" are independently hydrogen, a C1 to C30 alkyl group, a C6 to C30 aryl group, or a C7 to C30 arylalkyl group), or a group represented by Chemical Formula 2:

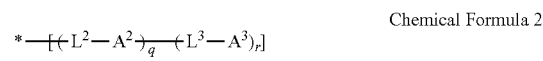

Chemical Formula 2 wherein, in Chemical Formula 2,
$L^2$ and $L^3$ are independently C(=O)O, C≡C, or C(=O) $NR^b$ (wherein, $R^b$ is hydrogen or a C1 to C20 alkyl group),
$A^2$ and $A^3$ are independently a substituted or unsubstituted C6 to C20 aromatic ring, a substituted or unsubstituted fluorene ring, or a substituted or unsubstituted C7 to C20 arylalkyl group,
q and r are independently an integer ranging from 0 to 2, provided that 1≤q+r≤2,
m is an integer ranging from 1 to 3, and
k and n are independently an integer ranging from 0 to 10.

3. The compound according to claim 1, wherein in Chemical Formula 1,
both o and p are 0,
$A^1$ is a benzene ring,
$R^a$ is hydrogen, a substituted or unsubstituted C1 to C20 alkyl group, a substituted or unsubstituted C1 to C20 alkoxy group, a substituted or unsubstituted C7 to C20 arylalkyl group, a substituted or unsubstituted C2 to C20 heteroaryl group, a halogen, or a group represented by Chemical Formula 2:

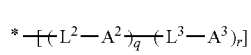

Chemical Formula 2 wherein, in Chemical Formula 2,
$L^2$ and $L^3$ are independently C(=O)O, C≡C, or C(=O)NR$^b$ (wherein, R$^b$ is hydrogen or a C1 to C20 alkyl group),
$A^2$ and $A^3$ are independently a substituted or unsubstituted benzene ring, a substituted or unsubstituted fluorene ring, or a substituted or unsubstituted C7 to C20 arylalkyl group,
q and r are independently an integer ranging from 0 to 2, provided that 1≤q+r≤2,
m is 1 or 2, and
k and n are independently an integer ranging from 0 to 3.

4. The compound according to claim 1, wherein the compound represented by Chemical Formula 1 is represented by Chemical Formula 3 or Chemical Formula 4:

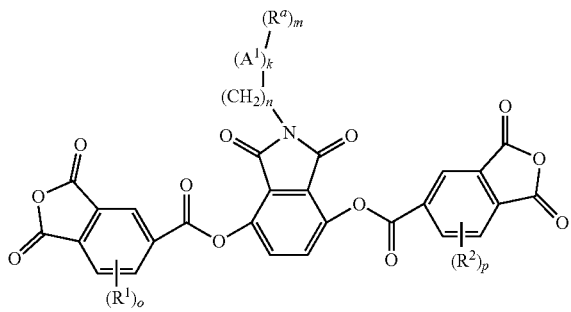

Chemical Formula 3

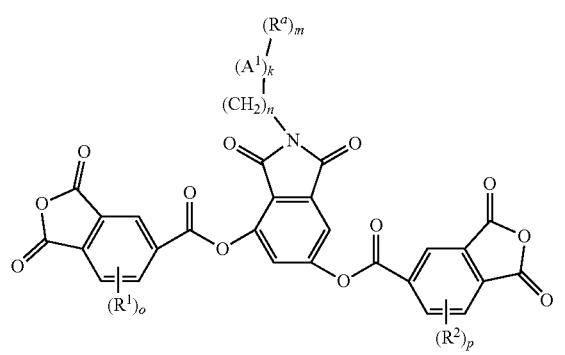

Chemical Formula 4 wherein, in Chemical Formulae 3 and 4,
$R^1$ and $R^2$ are independently a substituted or unsubstituted C1 to C30 alkyl group, a substituted or unsubstituted C1 to C30 alkoxy group, a substituted or unsubstituted C3 to C30 cycloalkyl group, a substituted or unsubstituted C6 to C30 aryl group, a substituted or unsubstituted C1 to C30 acyl group, a hydroxy group, a halogen, a nitro group, —NR'R", —SiR'R"R''' (wherein R', R", and R''' are independently hydrogen, a C1 to C30 alkyl group, or a C6 to C30 aryl group), or a combination thereof,
o and p are independently an integer ranging from 0 to 3,
$A^1$ is a C6 to C30 aromatic ring,
$R^a$ is hydrogen, a substituted or unsubstituted C1 to C30 alkyl group, a substituted or unsubstituted C1 to C30 alkoxy group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C2 to C30 heteroaryl group, a hydroxy group, a halogen, a nitro group, —NR'R", —C(=O)—NR'R", —SiR'R"R''' (wherein R', R", and R''' are independently hydrogen, a C1 to C30 alkyl group, a C6 to C30 aryl group, or a C7 to C30 arylalkyl group), or a group represented by Chemical Formula 2:

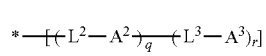

Chemical Formula 2 wherein, in Chemical Formula 2,
$L^2$ and $L^3$ are independently O, C(=O), C(=O)O, C≡C, or C(=O)NR$^b$ (wherein, R$^b$ is hydrogen or a C1 to C30 alkyl group),
$A^2$ and $A^3$ are independently a substituted or unsubstituted C6 to C30 aromatic ring, a substituted or unsubstituted fluorene ring, or a substituted or unsubstituted C7 to C30 arylalkyl group,
q and r are independently an integer ranging from 0 to 3, provided that q+r is an integer greater than or equal to 1,
m is an integer greater than or equal to 1, and
k and n are independently an integer greater than or equal to 0.

5. The compound according to claim 4, wherein in Chemical Formulae 3 and 4,
o and p are independently 0 or 1,
$A^1$ is a C6 to C30 aromatic ring,
$R^a$ is hydrogen, a substituted or unsubstituted C1 to C20 alkyl group, a substituted or unsubstituted C1 to C20 alkoxy group, a substituted or unsubstituted C7 to C20 arylalkyl group, a substituted or unsubstituted C2 to C20 heteroaryl group, a halogen, —NR'R" (wherein R', and R" are independently hydrogen, a C1 to C30 alkyl group, a C6 to C30 aryl group, or a C7 to C30 arylalkyl group), or a group represented by Chemical Formula 2:

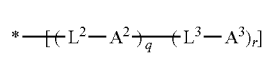

Chemical Formula 2 wherein, in Chemical Formula 2,
$L^2$ and $L^3$ are independently, C(=O)O, C≡C, or C(=O)NR$^b$ (wherein R$^b$ is hydrogen or a C1 to C20 alkyl group),
$A^2$ and $A^3$ are independently a substituted or unsubstituted C6 to C20 aromatic ring, a substituted or unsubstituted fluorene ring, or a substituted or unsubstituted C7 to C20 arylalkyl group, q and r are independently an integer ranging from 0 to 2, provided that 1≤q+r≤2, m is an integer ranging from 1 to 3, and k and n are independently an integer ranging from 0 to 10.

6. The compound according to claim 4, wherein in Chemical Formulae 3 and 4,
both o and p are 0,
$A^1$ is a benzene ring,
$R^a$ is hydrogen, a substituted or unsubstituted C1 to C10 alkyl group, a substituted or unsubstituted C1 to C10 alkoxy group, a substituted or unsubstituted C2 to C10 heteroaryl group, a halogen, or a group represented by Chemical Formula 2:

Chemical Formula 2

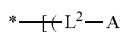

wherein, in Chemical Formula 2,
$L^2$ and $L^3$ are independently, C(=O)O, C≡C, or C(=O)NR$^b$ (wherein, R$^b$ is hydrogen or a C1 to C20 alkyl group),
$A^2$ and $A^3$ are independently a substituted or unsubstituted benzene ring, a substituted or unsubstituted fluorene ring, or a substituted or unsubstituted C7 to C20 arylalkyl group,
q and r are independently an integer ranging from 0 to 2, provided that 1≤q+r≤2,
m is 1 or 2, and
k and n are independently an integer ranging from 0 to 3.

7. A polymer, which is a product of reactants comprising the compound according to claim 1 and a diamine.

8. The polymer according to claim 7, wherein the diamine is represented by Chemical Formula 5:

$$NH_2—R^c—NH_2$$   Chemical Formula 5 wherein in Chemical Formula 5,
$R^c$ is a substituted or unsubstituted C6 to C30 aromatic organic group, wherein the substituted or unsubstituted C6 to C30 aromatic organic group is present as a substituted or unsubstituted single aromatic ring; a fused ring comprising two or more substituted or unsubstituted aromatic rings; or a ring system comprising two or more of the substituted or unsubstituted single aromatic ring and/or the fused ring that are linked by a single bond, or a functional group selected from a fluorenylene group, a substituted or unsubstituted C1 to C10 cycloalkylene group, a substituted or unsubstituted C6 to C15 arylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, —C(=O)NH—, or a combination thereof.

9. The polymer according to claim 8, wherein the diamine represented by Chemical Formula 5 is represented by at least one of Chemical Formula 6 to Chemical Formula 8:

Chemical Formula 6

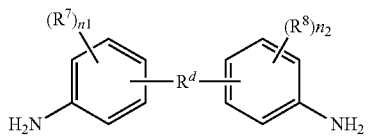

wherein, in Chemical Formula 6,
$R^d$ is selected from the following chemical formulae:

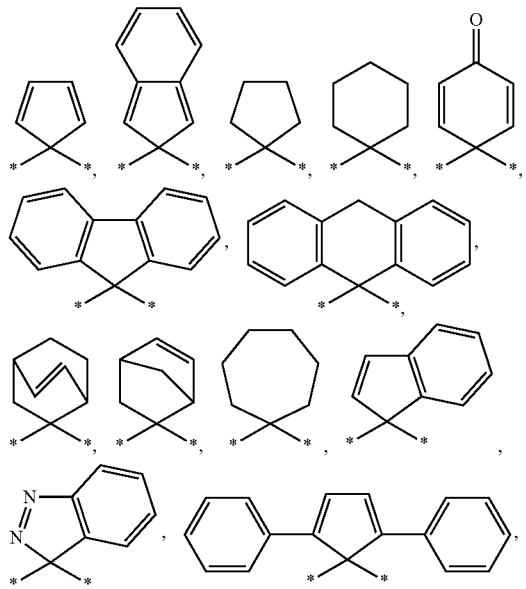

$R^7$ and $R^8$ are the same or different and are independently a halogen, a hydroxy group, an alkoxy group (—OR$^{200}$, wherein R$^{200}$ is a C1 to C10 aliphatic organic group), a silyl group (—SiR$^{201}$R$^{202}$R$^{203}$, wherein R$^{201}$, R$^{202}$, and R$^{203}$ are the same or different and are independently hydrogen or a C1 to C10 aliphatic organic group), a substituted or unsubstituted C1 to C10 aliphatic organic group, or a substituted or unsubstituted C6 to C20 aromatic organic group, and n1 and n2 are independently an integer ranging from 0 to 4;

Chemical Formula 7

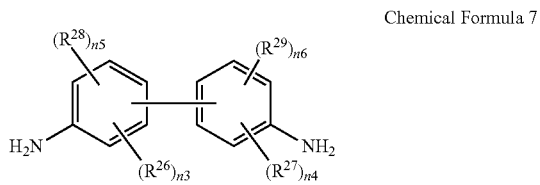

wherein, in Chemical Formula 7,
$R^{26}$ and $R^{27}$ are the same or different and are independently an electron withdrawing group selected from —CF$_3$, —CCl$_3$, —CBr$_3$, —Cl$_3$, —NO$_2$, —CN, —COCH$_3$, or —CO$_2$C$_2$H$_5$,
$R^{28}$ and $R^{29}$ are the same or different and are independently a halogen, a hydroxy group, an alkoxy group (—OR$^{204}$, wherein R$^{204}$ is a C1 to C10 aliphatic organic group), a silyl group (—SiR$^{205}$R$^{206}$R$^{207}$, wherein R$^{205}$, R$^{206}$, and R$^{207}$ are the same or different and are independently hydrogen or a C1 to C10 aliphatic organic group), a substituted or unsubstituted C1 to C10 aliphatic organic group, or a substituted or unsubstituted C6 to C20 aromatic organic group, n3 is an integer ranging from 1 to 4, and n5 is an integer ranging from 0 to 3, provided that n3+n5 is an integer ranging from 1 to 4, and n4 is an integer ranging from 1 to 4, and n6 is an integer ranging from 0 to 3, provided that n4+n6 is an integer ranging from 1 to 4;

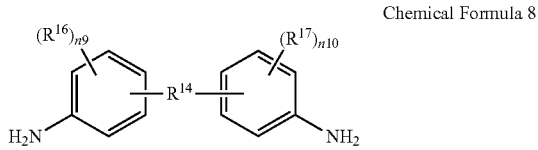

Chemical Formula 8 wherein, in Chemical Formula 8, $R^{14}$ comprises O, S, C(=O), CH(OH), S(=O)$_2$, Si(CH$_3$)$_2$, (CH$_2$)$_p$ (wherein, 1≤p≤10), (CF$_2$)$_q$ (wherein, 1≤q≤10), C(CH$_3$)$_2$, C(CF$_3$)$_2$, C(=O)NH, or a substituted or unsubstituted C6 to C18 aromatic organic group, wherein the substituted or unsubstituted C6 to C18 aromatic organic group is present as a single aromatic ring, a fused ring comprising two or more aromatic rings, or a ring system comprising two or more of the single aromatic ring and/or the fused ring that are linked by a single bond or a functional group selected from a fluorenylene group, O, S, C(=O), CH(OH), S(=O)$_2$, Si(CH$_3$)$_2$, (CH$_2$)$_p$ (wherein, 1≤p≤10), (CF$_2$)$_q$ (wherein, 1≤q≤10), C(CH$_3$)$_2$, C(CF$_3$)$_2$, or C(=O)NH, $R^{16}$ and $R^{17}$ are the same or different and are independently a halogen, a hydroxy group, an alkoxy group (—OR$^{212}$, wherein $R^{212}$ is a C1 to C10 aliphatic organic group), a silyl group (—SiR$^{213}$R$^{214}$R$^{215}$, wherein $R^{213}$, $R^{214}$, and $R^{215}$ are the same or different and are independently hydrogen or a C1 to C10 aliphatic organic group), a substituted or unsubstituted C1 to C10 aliphatic organic group, or a substituted or unsubstituted C6 to C20 aromatic organic group, and n9 and n10 are independently an integer ranging from 0 to 4.

10. The polymer according to claim 9, wherein the diamine represented by Chemical Formula 5 comprises at least one of the diamine represented by Chemical Formula 7 and the diamine represented by Chemical Formula 8.

11. The polymer according to claim 10, wherein the diamine represented by Chemical Formula 7 comprises 2,2'-bis(trifluoromethyl)benzidine (TFDB), and the diamine represented by Chemical Formula 8 comprises 4,4'-diaminodiphenyl sulfone (DADPS).

12. The polymer according to claim 7, wherein the reactants further comprises a dianhydride represented by Chemical Formula 9:

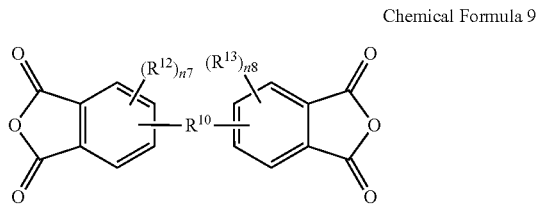

Chemical Formula 9 wherein in Chemical Formula 9, $R^{10}$ is a single bond, —O—, —S—, —C(=O)—, —CH(OH)—, —C(=O)NH—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, or —(CH$_2$)$_p$—C(C$_n$F$_{2n+1}$)$_2$—(CH$_2$)$_q$— (wherein 1≤n≤10, 1≤p≤10, and 1≤q≤10), $R^{12}$ and $R^{13}$ are independently a halogen, a hydroxy group, a substituted or unsubstituted C1 to C10 aliphatic organic group, a substituted or unsubstituted C6 to C20 aromatic organic group, a —OR$^{201}$ group (wherein $R^{201}$ is a C1 to C10 aliphatic organic group), or a —SiR$^{210}$R$^{211}$R$^{212}$ (wherein $R^{210}$, $R^{211}$, and $R^{212}$ are independently hydrogen or a C1 to C10 aliphatic organic group) group, and n7 and n8 are independently one of integers of 0 to 3.

13. The polymer according to claim 12, wherein the dianhydride represented by Chemical Formula 9 comprises a dianhydride represented by Chemical Formula 10, a dianhydride represented by Chemical Formula 11, or a combination thereof:

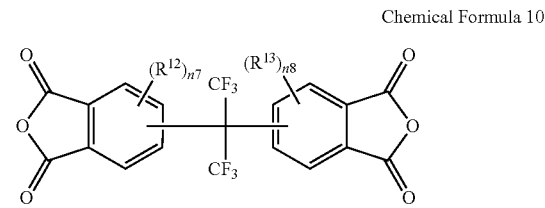

Chemical Formula 10

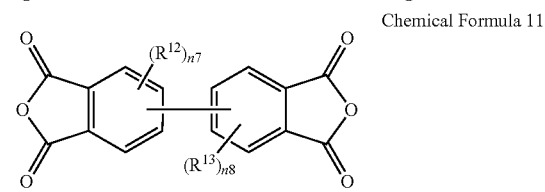

Chemical Formula 11 wherein, in Chemical Formulae 10 and 11, $R^{12}$ and $R^{13}$ are the same or different and are independently a halogen, a hydroxy group, an alkoxy group (—OR$^{208}$, wherein $R^{208}$ is a C1 to C10 aliphatic organic group), a silyl group (—SiR$^{209}$R$^{210}$R$^{211}$, wherein $R^{209}$, $R^{210}$, and $R^{211}$ are the same or different and are independently hydrogen or a C1 to C10 aliphatic organic group), a substituted or unsubstituted C1 to C10 aliphatic organic group, or a substituted or unsubstituted C6 to C20 aromatic organic group, and n7 and n8 are independently an integer ranging from 0 to 3.

14. The polymer according to claim 13, wherein at least one of the dianhydride represented by Chemical Formula 10 and the dianhydride represented by Chemical Formula 11 is comprised in an amount of about 1 mole percent to about 99 mole percent based on the total mole number of the dianhydrides.

15. The polymer according to claim 7, wherein the reactants further comprises a dicarboxylic acid derivative represented by Chemical Formula 12:

Chemical Formula 12 wherein, in Chemical Formula 12, $R^3$ is at least one of a substituted or unsubstituted phenylene group and a substituted or unsubstituted biphenylene group, and each X is the same or different and is a halogen atom.

16. The polymer according to claim 15, wherein $R^3$ of Chemical Formula 12 is at least one of an unsubstituted phenylene group and an unsubstituted biphenylene group, and each X is independently Cl or Br.

17. A film comprising the polymer according to claim 7.

18. The film according to claim 17, wherein the film is a compensation film.

19. An optical device comprising the film according to claim 17.

20. The optical device according to claim 19, wherein the optical device is a display device.

* * * * *